(12) United States Patent
Ahmed

(10) Patent No.: US 12,737,710 B2
(45) Date of Patent: Sep. 15, 2026

(54) CUSTOMER EXPERIENCE INDEX ESTIMATOR FOR A SMART SERVICE ANALYZER

(71) Applicant: Rakuten Symphony, Inc., Tokyo (JP)

(72) Inventor: Tasnim Ahmed, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 9 days.

(21) Appl. No.: 18/640,658

(22) Filed: Apr. 19, 2024

(65) Prior Publication Data

US 2025/0328850 A1 Oct. 23, 2025

(51) Int. Cl.
*G06Q 10/0639* (2023.01)

(52) U.S. Cl.
CPC .............................. *G06Q 10/06393* (2013.01)

(58) Field of Classification Search
CPC . G06Q 10/06; G06Q 10/063; G06Q 10/06393
See application file for complete search history.

(56) References Cited

U.S. PATENT DOCUMENTS 9,210,056 B1 * 12/2015 Choudhary ........... H04L 69/329
2013/0304905 A1 * 11/2013 Appachiappan .... H04L 41/5032 709/224
2014/0068348 A1 * 3/2014 Mondal ................. G06F 11/079 714/45
2016/0034570 A1 * 2/2016 Coster ................. G06F 16/3334 707/738
2017/0351689 A1 * 12/2017 Vasudevan ............ G06F 40/279
2020/0336396 A1 * 10/2020 Su .......................... G06N 20/20
2025/0078009 A1 * 3/2025 Thakare ........... G06Q 10/06398

OTHER PUBLICATIONS

Z. Deng et al., “Customer Satisfaction and Loyalty of Mobile Services,” 2009 Eighth International Conference on Mobile Business, Dalian, China, 2009, pp. 115-119.*
C. Jian et al., “Customer experience oriented service quality management,” 2012 IEEE Symposium on Robotics and Applications (ISRA), Kuala Lumpur, Malaysia, 2012, pp. 298-301.*
A. J. Garcia, M. Toril, P. Oliver, S. Luna-Ramirez and R. Garcia, “Big Data Analytics for Automated QoE Management in Mobile Networks,” in IEEE Communications Magazine, vol. 57, No. 8, pp. 91-97, Aug. 2019.*
J. Mongay Batalla et al., “On Assuring Survivability of Network Operator’s Services in Evolving Network Environment,” in IEEE Access, vol. 6, pp. 35646-35656, 2018.*
S. Singh et al., “Machine Learning Based Dynamic Restoration of Next Generation Wireless Networks,” 2022 IEEE International Conference on Communications Workshops (ICC Workshops), Seoul, Korea, Republic of, 2022, pp. 1-6.*

* cited by examiner

*Primary Examiner* — Timothy Padot
(74) *Attorney, Agent, or Firm* — HAUPTMAN HAM, LLP

(57) ABSTRACT

A method includes normalizing one or more key performance indicator (KPI), where the one or more KPI include user-level quantitative KPI or user-level qualitative KPI; determining whether weights are available for each normalized KPI; and in response to the weights being available for each normalized KPI, converting, based on the weights for each normalized KPI, each normalized KPI to a customer experience index (CEI) for each user and for each network service. The method further includes determining whether a trend shift has occurred based on the CEI; and automatically generating an alert in response to a determination that the trend shift occurred.

20 Claims, 11 Drawing Sheets

| RAW KPI VALUE (COVERAGE TAU SUCCESS RATIO) | KPI THRESHOLD (FROM STAKEHOLDERS) | KPI PERFORMANCE RANGE | KPI PERFORMANCE VALUE (NORMALIZED) |
|---|---|---|---|
| 99.9 | EXCELLENT (≥99.9) | 76%-100% | 100% |
| 99.8 | GOOD (98.5 TO 99.8) | 51%-75% | 75% |
| 98.5 | | | 51% |
| 98 | MODERATE (97 TO 98.4) | 26%-50% | 45% |
| 97 | | | 26% |
| 70 | BAD (0 TO 96.9) | 0%-25% | 18% |
| 0 | | | 0% |

800

CUSTOMER EXPERIENCE INDEX ESTIMATOR FOR A SMART SERVICE ANALYZER

TECHNICAL FIELD

This description relates to a customer experience index estimator for a smart service analyzer, and method of using the same.

BACKGROUND

A radio access network (RAN) is part of a telecommunication system and implements radio access technology. RANs reside between a device, such as a mobile phone, a computer, or remotely controlled machine, and provide connection with a core network (CN). Depending on the standard, mobile phones and other wireless connected devices are varyingly known as user equipment (UE), terminal equipment (TE), mobile station (MS), and the like.

Network performance prediction is usable for enabling agile capacity planning in mobile networks. Capacity planning for mobile networks presents a challenge for network planners as traffic in mobile networks continues to grow exponentially. In addition to the growing load on mobile networks, network performance dynamically changes. A performance downgrade is expected to occur in response to a lack of investment in additional capacity. Simultaneously, user and application demand for throughput and latency is ever increasing.

SUMMARY

In some embodiments, a method includes normalizing one or more key performance indicator (KPI). The one or more KPI include user-level quantitative KPI or user-level qualitative KPI. Whether weights are available for each normalized KPI are determined. In response to the weights being available for each normalized KPI, based on the weights for each normalized KPI, each normalized KPI is converted to a customer experience index (CEI) for each user and for each network service. The method further includes determining whether a trend shift has occurred based on the CEI; and automatically generating an alert in response to a determination that the trend shift occurred.

In some embodiments, an apparatus is configured to normalize one or more key performance indicator (KPI). The one or more KPI includes user-level quantitative KPI or user-level qualitative KPI. Whether weights are available for each normalized KPI are determined. In response to the weights being available for each normalized KPI, based on KPI weights, each normalized KPI is converted to a customer experience index (CEI) for each user and for each network service. The apparatus is further configured to determine whether a trend shift has occurred based on the CEI; and automatically generate an alert in response to a determination that the trend shift occurred.

In some embodiments, a non-transitory computer-readable media having computer-readable instructions stored thereon, which when executed perform operations to normalize one or more key performance indicator (KPI). The one or more KPI include user-level quantitative KPI or user-level qualitative KPI. Whether weights are available for each normalized KPI are determined. In response to the weights being available for each normalized KPI, based on KPI weights, each normalized KPI is converted to a customer experience index (CEI) for each user and for each network service. The instructions are further configured to determine whether a trend shift has occurred based on the CEI; and automatically generate an alert in response to a determination that the trend shift occurred.

BRIEF DESCRIPTION OF THE DRAWINGS

Features, aspects, and advantages of embodiments of the disclosure will be described below with reference to the accompanying drawings, in which like reference numerals denote like elements, and wherein.

DETAILED DESCRIPTION

Figure 1:
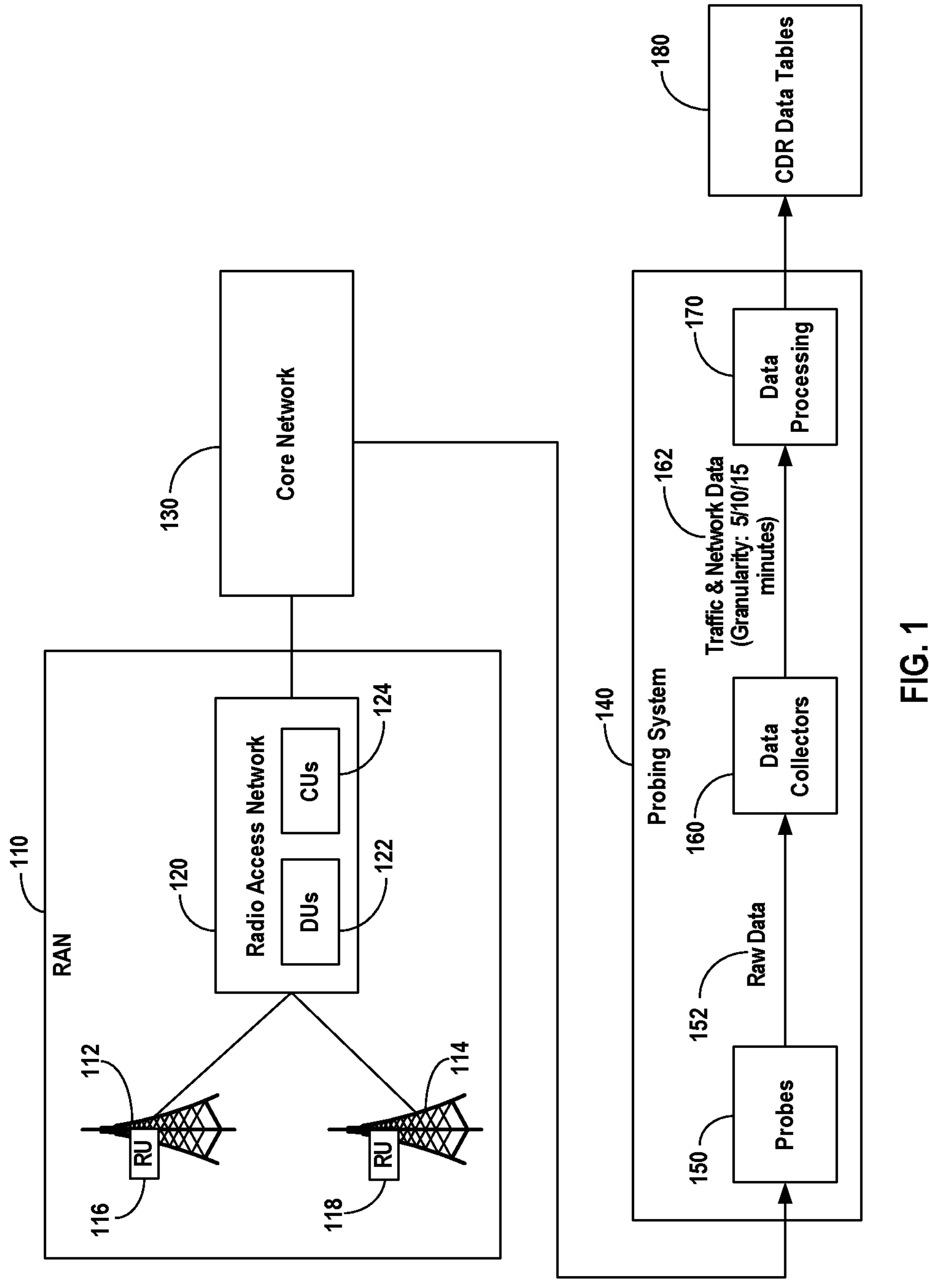
FIG. 1 illustrates a block diagram of a Mobile Network according to some embodiments.

The following detailed description of example embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, the flowchart and description of operations provided below relate to one of the various embodiments. It should be noted that it is possible to make other embodiments that do not exactly match the flowchart and its description. It is understood that in other embodiments one or more operations may be omitted, one or more operations may be added, one or more operations may be performed simultaneously (at least in part).

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of implementations. In fact, many of these features may be combined in ways not specifically recited in the claims and/or disclosed in the specification. Although each dependent claim listed below may directly depend on only one claim, the disclosure of implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]," "[A] and/or [B]," or "at least one of [A] or [B]" are to be understood as including only A, only B, or both A and B.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming, or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

In other approaches, the process of adding capacity to mobile networks comes with long cycles. Mobile operators typically need six months to add a 4G or a 5G layer, and two years to build new base stations. There is pressure to justify capital expenditures. In such circumstances, predictive planning plays an important role. The decision-making process on capacity addition needs to be based on the accurate estimation of future network performance, and what-if evaluations of different scenarios of traffic growth, network performance and capacity expansions.

Predicting user experience in terms of data throughput in Fourth Generation (4G) and Fifth Generation (5G) mobile networks, which are based on Orthogonal Frequency Division Multiple Access (OFDMA) techniques, involves consideration of various parameters. For example, spectrum assets of mobile operators are spread over channels in different frequency bands. Channel bandwidth in Long Term Evolution (LTE) systems is 5, 10, 15 or 20 MHz, while in 5G channel bandwidth is 50-100 MHz in lower frequency bands, and up to 400 MHz on higher frequency bands. LTE and 5G systems have resource grids deployed over channels, where the available spectrum is split into Resource Blocks (RBs). In LTE, Resource Blocks (RBs) have a size of 180 kHz, whereas in 5G the size is flexible with a value between 180 kHz and 1440 kHz, depending on use case/numerology.

User data throughput in such systems is driven by the number of available resource blocks for users and spectral efficiency of the system. The number of available resource blocks that are shared between users depends on various factors, including network density (number of base stations deployed in area of interest), user density (number of users to be served in area of interest) and deployed capacity (number of frequency channels and bandwidths used by base stations on 4G and 5G networks). Spectral efficiency of the system is measured as an achievable throughput per RB.

Network planners are thus called on to estimate the performance of different services, such as Voice Call, Video Applications, Gaming Applications, Streaming, Roaming, or other services within the scope of the embodiments, at the user and the network level. Performance patterns change depending on various factors, such as spectrum assets, network grid-topology and density, quality of radio design and implemented radio solutions, network maturity, user distribution and traffic mix, or other factors within the scope of the embodiments. Mobile communication systems provide a very advanced performance measurement capability. Measurements cover different events in the network and various metrics are available. For example, probing devices in the network infrastructure collect Call Direct Record (CDR) data by monitoring, recording, and analyzing network activity at the subscriber level. The performances are estimated as Numerical Index or Ratio (0~100%). The User Level Index is referred to as Customer Experience Index (CEI) and the Network Level Index is referred to as Service Quality Index (SQI). Key Performance Indictors (KPIs) are applied to CDR data. However, difficulty lies in the ability to process the large volume of CDR data, as well as the transformation of such a large volume of data into actionable intelligence. The Smart Service Analyzer is a Machine Learning (ML) based architecture that performs sophisticated activity in terms of processing. The Smart Service Analyzer is usable to reliably estimate the performance of different services like voice calls, video applications, gaming applications, streaming data, roaming, or other services within the scope of the embodiments at the user and the network level. The Smart Service Analyzer determines the performance of those services. The performances are estimated as numerical index or ratio (0-100%). The user level index is referred to as Customer Experience Index (CEI) and the Network Level Index is referred to as Service Quality Index (SQI) for a particular network or a portion of the network. ML is applied at CEI Estimator and the SQI Estimator using historical user level KPIs. KPIs are parameters of the key performance indicators collected from the Call Direct Record (CDR) data, which comes from the probing devices of the network architecture/network infrastructure. The CEI and SQI estimation is generalized so that the CEI and SQI do not utilize any change or modification after KPIs are added to a service or removed from a service. Data Analytics and ML algorithms are applied to automatically estimate the priority of the KPIs in a service. KPI Performance Thresholds are dynamically updated by analyzing trend shifts. A KPI Normalizer normalizes User Level Qualitative KPIs and User Level Quantitative KPIs. User Level Qualitative Key Performance Indicators (KPIs) and User Level Quantitative KPIs are received by a KPI Normalizer. The User Level Qualitative KPIs are provided to a Multi Scale Normalizer. The User Level Qualitative KPIs are normalized using the Multi Scale Normalizer based on KPI Performance Thresholds associated with the User Level Qualitative KPIs to produce Normalized Qualitative KPIs. User Level Quantitative KPIs are provided to a Trend Deviation Based KPI Normalizer. The User Level Quantitative KPIs are normalized using the Trend Deviation Based KPI Normalizer to produce Normalized Quantitative KPIs based on a Trend Update.

A method includes normalizing one or more key performance indicator (KPI). The one or more KPI include user-level quantitative KPI or user-level qualitative KPI. Whether weights are available for each normalized KPI are determined. In response to the weights being available for each normalized KPI, based on the weights for each normalized KPI, each normalized KPI is converted to a customer experience index (CEI) for each user and for each network service. The method further includes determining whether a trend shift has occurred based on the CEI; and automatically generating an alert in response to a determination that the trend shift occurred.

The embodiments described herein provide method that provides one or more advantages. For example, the Smart Service Analyzer provides an end-to-end automated solution. The Smart Service Analyzer is usable by network engineers as a tool used to estimate the impact of different services at the user level and at the network level without updating logic and while adding or deleting KPIs from a service. The Smart Service Analyzer notifies stakeholders via automatic email systems while any significant deviation or change is detected in quantitative KPI trends. A KPI Normalizer normalizes User Level Qualitative KPIs and User Level Quantitative KPIs.

FIG. 1 illustrates a block diagram of a Mobile Network 100 according to some embodiments.

In FIG. 1, Mobile Network 100 includes Radio Access Network (RAN) 110. RAN 110 includes eNodeBs 112, 114 for a cell site, which connect to functional units that form the Radio Network Controller 120. RAN 110 is connected to Core Network (CN) 130, which provides access to voice and data networks, such as Internet and Public Switched Telephone Network (PSTN). Disaggregation of RAN 110 involves breaking down of functions into Radio Units (RUs) 116, which are located at the cell tower, Distributed Units (DUs) 122, and Centralized Units (CUs) 124 that form the remainder of the RAN 110. The distribution of the of the RAN across these components is defined by the functional split option that is usable. There are various split options for how the RAN functions are split between the RUs 116, 118, DUs 122, and CUs 124.

Mobile Network further includes Probing System 140 for obtaining data about Mobile Network 100. Probing System 140 includes Probes 150. Probes 150 obtain Raw Data 152 that is provided to Data Collectors 160. Data Collectors 160 provides Traffic Network Data 162 to Data Processing 170. Data Processing 170 generates CDR Data Tables 180 based on Traffic and Network Data 162.

Probes 150 obtain Raw Data 152 from Mobile Network 100 to use as input to a KPI Generator. Probes 150 are devices or software that act as a messenger and converts network communications into an analyzable format. Probes 150 are used to obtain Raw Data 152 about traffic in the Mobile Network 100 that is usable to obtain reliable insight into the subscriber experience and used to analyze the performance and behavior of components of Mobile Network 100 via KPIs. Raw Data 152 is processed into a format, e.g., CDR Data Tables 180, that is usable to troubleshoot issues on Mobile Network 100 and to identify root cause of the issue by generating CDR Data Tables 180 per session per subscriber.

CDR Probing Data Tables 180 are provided to a KPI Generator as described below. The CDR Data Tables 180 are provided at a predetermined granularity, e.g., 5 minutes, 10 minutes, 15 minutes, or other suitable timeframes within the scope of the embodiments. CDR Data Tables 180 include information broken down into different categories. The categories include GI (general packet radio service (GPRS) interface), GN interface, Reference Signal Received Power (RSRP), Session Initiation Protocol (SIP), Radio Resource Control (RRC) LTE, S2 Application Protocol (S2AP), Diameter interface, or other categories within the scope of the embodiments. Probes 150 obtain different types of Raw Data 152 from different types of modules of Mobile Network 100, e.g., DUs 122, CUs 124, or the like, which is accumulated by Data Collectors 160. Traffic and Network Data is processed at Data Processing 170 to produce CDR Data Tables 180. Previously, historical probing data was used instead of the User Level KPIs.

Figure 2:
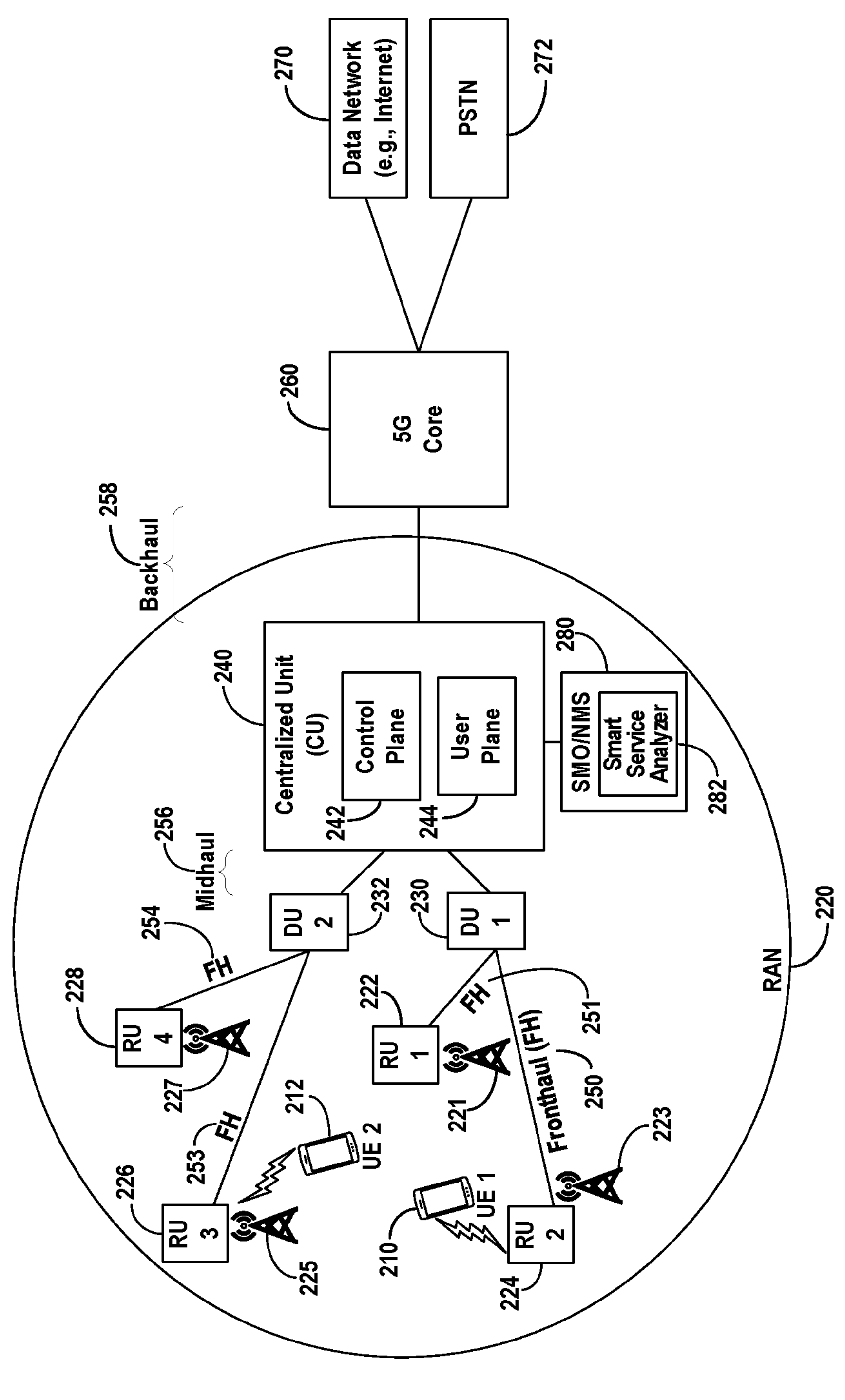
FIG. 2 illustrates a mobile network according to some embodiments.

FIG. 2 illustrates a mobile network 200 according to some embodiments.

In FIG. 2, UE 2 (User Equipment 2) 210 and UE 2 212 access Mobile Network 200 via a Radio Access Network (RAN) 220. Software functions of RAN 220 are separated from specialized hardware, which is referred to as disaggregation. Disaggregation leads to the virtualization of RAN software, thus enabling RAN functions to be hosted on general-purpose, commercial-off-the-shelf (COTS) hardware. Thus, functions of RAN 220 are split using different split options to implement a Centralized-RAN or Cloud-RAN (C-RAN), Virtualized RAN (V-RAN), an Open-RAN (O-RAN).

RAN 220 includes Radio Towers 221, 223, 225, and 227. Radio Towers 221, 223, 225, 227 are associated with RU (Radio Unit) 2 222, RU 2 224, RU 3 226, and RU 4 228, respectively.

RU 2 222, RU 2 224, RU 3 226, RU 4 228 handle the Digital Front End (DFE) and the parts of the PHY layer, as well as the digital beamforming functionality. RU 2 222 and RU 2 224 are associated with Distributed Unit (DU) 2 230, and RU 3 226 and RU 4 228 are associated with DU 2 232. DU 2 230 and DU 2 232 are responsible for real time Layer 2 and Layer 2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer 2 is the data link or protocol layer that defines how data packets are encoded and decoded, how data is to be transferred between adjacent network nodes. Layer 3 is the network routing layer and defines how data moves across the physical network.

DU 2 230 is coupled to RU 2 222 and RU 2 224, and DU 2 232 is coupled to RU 3 226 and RU 4 228. DU 2 230 and DU 2 232 run the RLC, MAC, and parts of the PHY layer. DU 2 230 and DU 2 232 include a subset of the eNB/gNB functions, depending on the functional split option, and operation of DU 2 230 and DU 2 232 are controlled by Centralized Unit (CU) 240. CU 240 is responsible for non-real time, higher L2 and L3. Server and relevant software for CU 240 is hosted at a site or is hosted in an edge cloud (datacenter or central office) depending on transport availability and the interface for the Fronthaul connections 250, 251, 253, 254. The server and relevant software of CU 240 is further able to be co-located at DU 2 230 or DU 2 232 or is hosted in a regional cloud data center.

CU 240 handles the RRC and PDCP layers. The gNB includes CU 240 and one or more DUs, e.g., DU 2 230, connected to CU 240 via Fs-C and Fs-U interfaces for a Control Plane (CP) 242 and User Plane (UP) 244, respectively. CU 240 with multiple DUs, e.g., DU 2 230, and DU 2 232, support multiple gNBs. The split architecture enables a 5G network to utilize different distribution of protocol stacks between CU 240, and DU 2 230 and DU 2 232, depending on network design and availability of the Midhaul 256. While two connections are shown between CU 240 and DU 2 230 and DU 2 232, CU 240 implements additional connections to other DUs. CU 250, in 5G, implements, for example, 256 endpoints or DUs. CU 240 supports the gNB functions such as transfer of user data, mobility control, RAN sharing (MORAN), positioning, session management, etc. However, one or more functions are allocated to the DU. CU 240 controls the operation of DU 230 and DU 232 over Midhaul interface 256.

Backhaul 258 connects the 4G/5G Core 260 to the CU 240. Core 260 may be, for example, up to 200 km away from CU 240. Core 260 provides access to voice and data networks, such as Internet 270 and Public Switched Telephone Network (PSTN) 272.

RAN 220 implements beamforming that allows for directional transmission or reception. 5G beamforming enables 5G connections to be more focused toward a receiving device. RAN 220 is further able to implement MIMO (Multiple Input Multiple Output), including mMIMO (massive MIMO), to provide an increase in throughput and signal-to-noise ratio (SNR). MIMO improves the radio link by using the multiple paths over which signals travel from the transmitter to the receiver. The multiple paths are decorrelated, and this provides the opportunity to send multiple data streams over them.

Massive MIMO and dense small cell deployments are being implemented to improve radio resource efficiency. However, the intra-cell interference from neighboring cells presents a serious problem. According to some embodiments, the modeling of interference patterns in a Massive MIMO deployment is usable to identify interfering beams between different sectors so that interference optimization techniques are applied to address interference.

According to some embodiments, a northbound platform for the network is provided, such as a Service Management and Orchestration (SMO)/NMS 280. SMO 280 oversees the orchestration aspects, and the management and automation of RAN elements. SMO 280 supports O1, A1 and O2 interfaces. SMO 280 includes Smart Service Analyzer 282, which is a ML based architecture that performs sophisticated activity in terms of processing. Smart Service Analyzer 282 is usable to reliably estimate the performance of different services like voice calls, video applications, gaming applications, streaming data, roaming, etc. at the user and the network level. Smart Service Analyzer 282 determines the performance of those services. The performances are estimated as numerical index or ratio (0-100%). The user level index is referred to as Customer Experience Index (CEI) and the Network Level Index is referred to as Service Quality Index (SQI) for a particular network or a portion of the network. KPI Normalizer 284 is usable to normalize KPI values in a performance Range between 0 and 100%.

Smart Service Analyzer 282 applies ML to generate CEI Estimates and SQI Estimates using user level KPIs. KPIs are parameters of the key performance indicators collected from the Call Direct Record (CDR) data, which comes from the probing devices of the network architecture/network infrastructure. Smart Service Analyzer 282 provides CDR Probing Data obtained from the probing devices to a KPI Generator, where arithmetic operations are run that use multiple columns of the CDR Probing Data and maps columns to apply arithmetic operation. Smart Service Analyzer 282 receives a mapping table from network engineers to map KPIs to columns in tables of the CDR Probing Data.

Smart Service Analyzer 282 further receives arithmetic logic-based Aggregation Formula for KPIs that are used by the KPI Generator to generate KPIs from the CDR Probing data. After running the arithmetic operations, the Smart Service Analyzer 282 provides User Level KPIs to a CEI Estimator. Smart Service Analyzer 282 further receives Service-wise KPI Importance, such as Critical, High, Medium, and Low Indicators, and KPI Performance Thresholds for Qualitative KPIs. Quantitative KPI Performance Thresholds are dynamically updated by analyzing trend deviations.

Based on the Service-Wise Importance, Smart Service Analyzer 282 estimates the priority of the KPIs in a service. Smart Service Analyzer 282 applies ML at the CEI Estimator to produce estimates of CEI at the service level based on the User Level KPIs. Smart Service Analyzer 282 estimates the KPI wight distribution for the services and aggregates KPI performance per service at the user level. KPI Normalizer 284 normalizes KPI values in a performance Range between 0 and 100%. Thus, Smart Service Analyzer 282 generalizes estimates of CEI. Generalizing estimates of CEI results in no change or modification in response to a KPI being added or removed from a particular service. Previously, different types of predefined rule-based algorithms were changed in response to a KPI being removed from some service or added to a service. KPI trend shift events are detected, and alarms are automatically emailed to stakeholders or other experts, such as domain experts, network engineers, managers, etc.

Smart Service Analyzer 282 provides the User Level KPIs to an Aggregator for aggregation to produce Network Level KPIs. Smart Service Analyzer 282 provides the Network Level KPIs, along with the User Level CEI Estimates as input to SQI Estimator.

Smart Service Analyzer 282 applies ML at the SQI Estimator to produce Network KPI Weight Distribution and aggregation of User Level CEI Estimates and/or Network Level KPIs per service. Smart Service Analyzer 282 applies the ML at the SQI Estimator using the Service-wise KPI Importance and KPI Performance Thresholds.

Smart Service Analyzer 282 calculates or estimates Network Level SQI Estimates in two ways. First, Smart Service Analyzer 282 uses the User Level CEI Estimates output from the CEI Estimator and applies ML to estimate the Network Level SQI Estimates. Alternatively, Smart Service Analyzer 282 uses the User Level KPIs aggregated at the network level, i.e., Network Level KPIs, and applies ML to calculate Network SQI Estimates.

Figure 3:
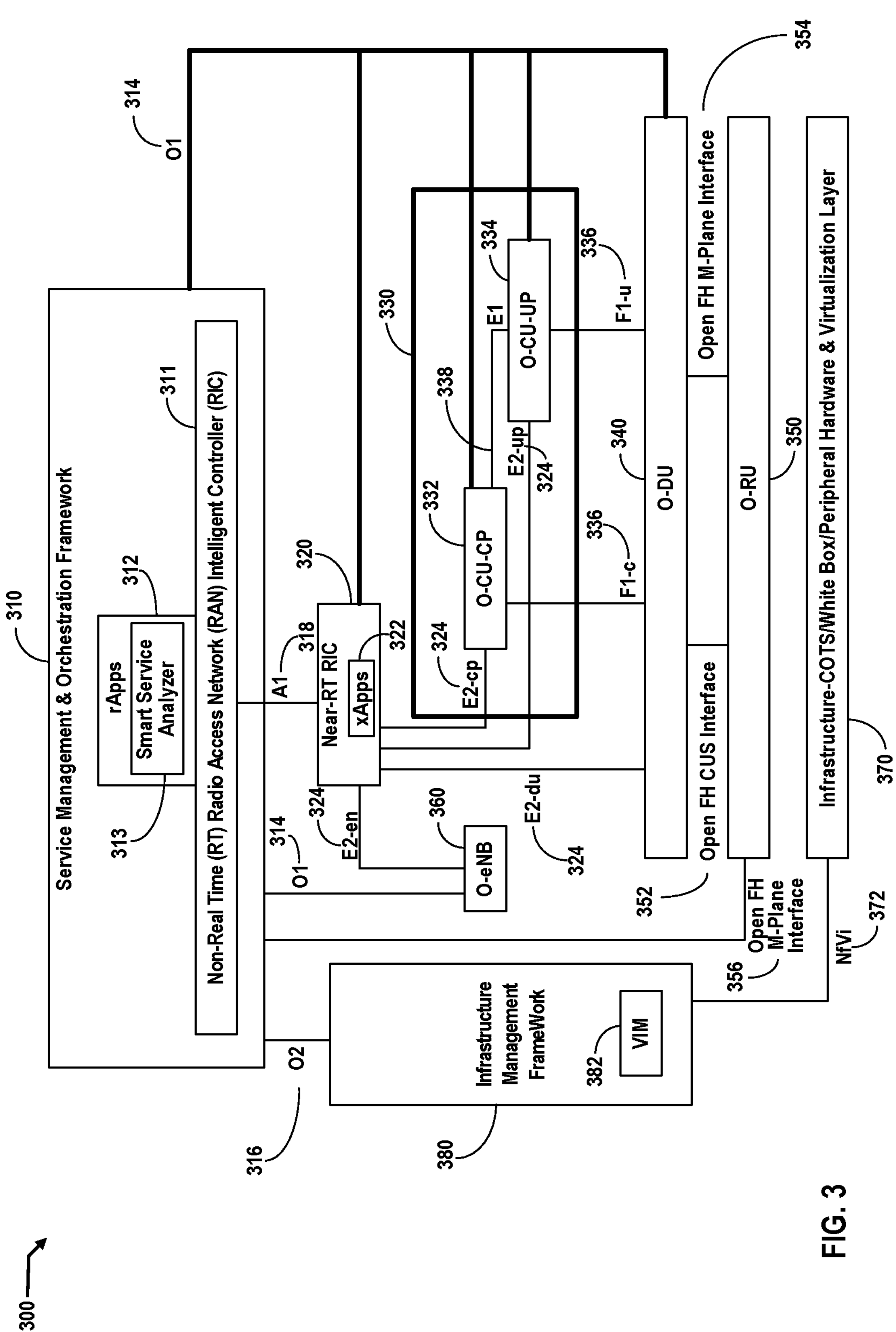
FIG. 3 is a block diagram of an Open Radio Access Network (O-RAN) according to some embodiments.

FIG. 3 is a block diagram of an Open Radio Access Network (O-RAN) 300 according to some embodiments.

In FIG. 3, Service Management and Orchestration (SMO) Framework 310 is an automation platform for Open RAN Radio Resources. SMO 310 oversees lifecycle management of network functions as well as O-Cloud. SMO 310 includes a Non-Real-Time (RT) Radio Access Network (RAN) Intelligent Controller (RIC) 311. SMO 310 further defines various SMO interfaces, such as the O1 315, O2 316, and A1 318 interfaces.

The A1 interface 318 enables communication between the non-RT RIC 311 and a Near-RT RIC 320 and supports policy management, data transfer, and ML management. The A1 interface 318 is further used for policy guidance. SMO 310 provides fine-grained policy guidance such as getting User-Equipment to change frequency, and other data enrichments to RAN functions over the A1 interface 318.

The O1 315 interface connects the SMO 310 to the RAN managed elements, which include the Near-RT RIC 320, O-RAN Centralized Unit (O-CU) 330, O-RAN Distributed Unit (O-DU) 340, and the Open Evolved NodeB (O-eNB) 360. The management and orchestration functions are received by the managed elements via the O1 interface 315. The SMO 310 in turn receives data from the managed elements via the O1 interface 315 for AI model training at the non-RT RIC 311. The O1 interface 315 is further used for managing the operation and maintenance (OAM) of multi-vendor Open RAN functions including fault, configuration, accounting, performance and security management, software management, and file management capabilities.

The O2 interface 316 is usable to support cloud infrastructure management and deployment operations with O-Cloud infrastructure that hosts the Open RAN functions in the network. The O2 interface 316 supports orchestration of O-Cloud infrastructure resource management (e.g., inventory, monitoring, provisioning, software management and lifecycle management) and deployment of the Open RAN network functions, providing logical services for managing the lifecycle of deployments that use cloud resources.

SMO 310 provides a common data collection platform for management of RAN data as well as mediation for the O1 315, O2 316, and A1 318 interfaces. Licensing, access control and AI/ML lifecycle management are supported by the SMO 310, together with legacy north-bound interfaces. SMO 310 further supports existing OSS functions, such as service orchestration, inventory, topology, and policy control.

The Non-RT RIC 311 enables non-real-time (>1 second) control of RAN elements and their resources through cloud-native microservice-based applications, which are referred to as rApps 312. An rApp 312 implements a Smart Service Analyzer 313 that includes a Key Performance Indicator (KPI) Normalizer 314. Non-RT RIC 311 communicates with applications called xApps 322 running on a Near-RT RIC 311 to provide policy-based guidance for edge control of RAN elements and their resources. The Non-RT RIC 311 provides non-real-time control and optimization of RAN elements and resources, AI/ML workflow, including model training of the KPI Normalizer 314 of Smart Service Analyzer 313, updates, and policy-based guidance of applications/features in Near-RT RIC 320.

Near-RT RIC 320 controls RAN infrastructure at the cloud edge. Near-RT RIC 320 controls RAN elements and their resources with optimization actions that typically take 10 milliseconds to one second to complete. The Near-RT RIC 320 receives policy guidance from the non-RT RIC 311 and provides policy feedback to the non-RT RIC 311 through xApps 322.

The xApps 322 are used to enhance the RAN's spectrum efficiency. The Near-RT RIC 320 manages a distributed collection of "southbound" RAN functions, and further provides "northbound" interfaces for operators: the O1 315 and A1 318 interfaces to the non-RT RIC 311 for the management and optimization of the RAN. The Near-RT RIC 320 is thus able to self-optimize across different RAN types, like macros, Massive MIMO, and small cells, maximizing network resource utilization for 5G network scaling.

Within the Near-RT RIC 320, the xApps 322 communicate via defined interface channels. An internal messaging infrastructure provides the framework to handle conflict mitigation, subscription management, app lifecycle management functions, and security. Data transfers are implemented via the E2 interfaces 324.

The O-RAN is split into a Central Unit (CU) 330, a Distributed Unit (DU) 340, and a Radio Unit (RU) 350. The CU 330 is further split into two logical components, one for the Control Plane (CP) 332, and one for the User Plane (UP) 334. The logical split of the CU 330 into the CP 332 and UP 334 allows different functionalities to be deployed at different locations of the network, as well as on different hardware platforms. For example, CUs 330 and DUs 340 can be virtualized on white box servers at the edge, while the RUs 350 are implemented on Field Programmable Gate Arrays (FPGAs) and Application-specific Integrated Circuits (ASICs) boards and deployed close to RF antennas.

The O-RAN Distributed Unit (O-DU) 340 is an edge server that includes baseband processing and radio frequency (RF) functions. The O-DU 340 hosts radio link control (RLC), MAC, and a physical layer with network function virtualization or containers. O-DU 340 supports one or more cells, and the O-DUs 340 supports one or more beams to provide the operating support for O-RU 350 by CUS (Control, User, and Synchronization) planes 352, and management (M) planes 354 through front-haul interfaces.

The O-RU 350 processes radio frequencies received by the physical layer of the network. The processed radio frequencies are sent to the O-DU 340 through fronthaul interfaces 352, 354. The O-RU 350 hosts the lower PHY Layer Baseband Processing and RF Front End (RF FE) and is designed to support multiple 3GPP split options.

An Open-Evolved Node B (O-eNB) 360 provides the hardware aspect of the O-RAN. The management and orchestration functions are received by the managed elements via the O1 interface 315. The SMO 310 in turn receives data from the managed elements via the O1 interface 315 for the KPI Normalizer 314 of Smart Service Analyzer 313 implemented by rApps 312 at non-RT RIC 311. The O-eNB 360 communicates with the Near-RT RIC 320 via the E2 interface 324. E2 324 enables near-real-time loops through the streaming of telemetry from the RAN and the feedback with control from the Near-RT RIC 320. The E2 interface 324 connects the Near-RT RIC 320 with an E2 node, such as the O-CU-CP 332, O-CU-UP 334, the O-DU 340, and the O-eNB 360. An E2 node is connected to one Near-RT RIC 320, while a Near-RT RIC 320 is connected to multiple E2 nodes. The protocols over the E2 interface 324 are based on the control plane and supports services and functions of Near-RT RIC 320.

An F1 Interface 336 connects the O-CU-CP 332 and the O-CU-UP 334 to the O-DU 340. Thus, the F1 interface 336 is broken into control and user plane subtypes and exchanges data about the frequency resource sharing and other network statuses. One O-CU 330 can communicate with multiple O-DUs 340 via F1 interfaces 336.

An E1 338 interface connects the O-CU-CP 332 and the O-CU-UP 334. The E1 Interface 338 is usable to transfer configuration data and capacity information between the O-CU-CP 332 and the O-CU-UP 334. The configuration data ensures the O-CU-CP 332 and the O-CU-UP 334 are able to interoperate. The capacity information is sent from the O-CU-UP 334 to the O-CU-CP 332 and includes the status of the O-CU-UP 334.

The O-DU 340 communicates with the O-RU 350 via an Open Fronthaul (FH) Control, User, and Synchronization (CUS) Plane Interface 352 and an Open Fronthaul (FH) M-Plane (Management Plane) Interface 354. As part of the CUS Plane Interface 352, the C-Plane (control plane) is a frame format that carries data in real-time control messages between the O-DU 340 and O-RU 350 for use to control user data scheduling, beamforming weight selection, numerology selection, etc. Control messages are sent separately for downlink (DL)-related commands and uplink (UL)-related commands.

The U-Plane of the CUS Plane Interface 352 carries the user data messages between the O-DU 340 and O-RU 350, such as the in-phase and quadrature-phase (IQ) sample sequence of the orthogonal frequency division multiplexing (OFDM) signal. The S-plane of the CUS Plane Interface 352 includes synchronization messages used for timing synchronization between O-DU 340 and O-RU 350. The Control and User Plane of the CUS Plane Interface 352 is further used to send information specifying beamforming weights from the O-DU 340 to O-RU 350. Other information includes time resource and frequency resource information.

The Open FH M-Plane 354 connects the O-RU 350 to the O-DU 340, and an optional Open FH M-Plane 356 connects the O-RU 350 to the SMO 310. The O-DU 340 uses the Open FH M-Plane 354 to manage the O-RU 350, while the SMO 310 provides FCAPS (Fault, Configuration, Accounting, Performance, Security) services to the O-RU 350. The Open FH M-plane 354 supports the management features including startup installation, software management, configuration management, performance management, fault management and file management.

The Open FH M-Plane 354 is usable by the O-DU 340 to retrieve the capabilities of the O-RU 350 and to send relevant configuration related to the C-Plane and U-Plane (data plane) of the Open FH CUS Interface 352 to the O-RU 350. Together the O1 315 and Open FH M-plane 354 interfaces provide a FCAPS interface with configuration, reconfiguration, registration, security, performance, monitoring aspects exchange with individual nodes, such as O-CU-CP 332, O-CU-UP 334, O-DU 340, and O-RU 350, as well as non-RT RIC 320.

According to some embodiments, AI-Based Network Management is provided at the 5G Edge, such as by a Smart Service Analyzer 313 of rApp 312 at a non-RT RIC 311.

The Smart Service Analyzer 313 is an ML based architecture that performs sophisticated activity in terms of processing. The Smart Service Analyzer 313 is usable to reliably estimate the performance of different services like voice calls, video applications, gaming applications, streaming data, roaming, etc. at the user and the network level. The Smart Service Analyzer 313 determines the performance of those services. The performances are estimated as numerical index or ratio (0-100%). The user level index is referred to as Customer Experience Index (CEI) and the Network Level Index is referred to as Service Quality Index (SQI) for a particular network or a portion of the network. ML is applied to generate CEI Estimates and SQI Estimates using historical user level KPIs. KPIs are parameters of the key performance indicators collected from the Call Direct Record (CDR) data, which comes from the probing devices of the network architecture/network infrastructure. The CEI Estimates and SQI Estimates are generalized so that the Smart Service Analyzer 313 does not utilize any change or modification after KPIs are added to a service or removed from a service. Data Analytics and ML algorithms are applied by the Smart Service Analyzer 313 to automatically estimate the priority of the KPIs in a service. KPI Normalizer 314 is usable to normalize KPI values in a performance Range between 0 and 100%. KPI Performance Thresholds are dynamically updated by analyzing trend shifts.

Infrastructure-COTS/White Box/Peripheral Hardware & Virtualization Layer 370 connects to Infrastructure Management Framework 380 via Network Function Virtualization Interface (NFVI) 372. Virtualized Infrastructure Manager (VIM) 382 at Infrastructure Management Framework 380 controls and manages virtual network functions.

Figure 4:
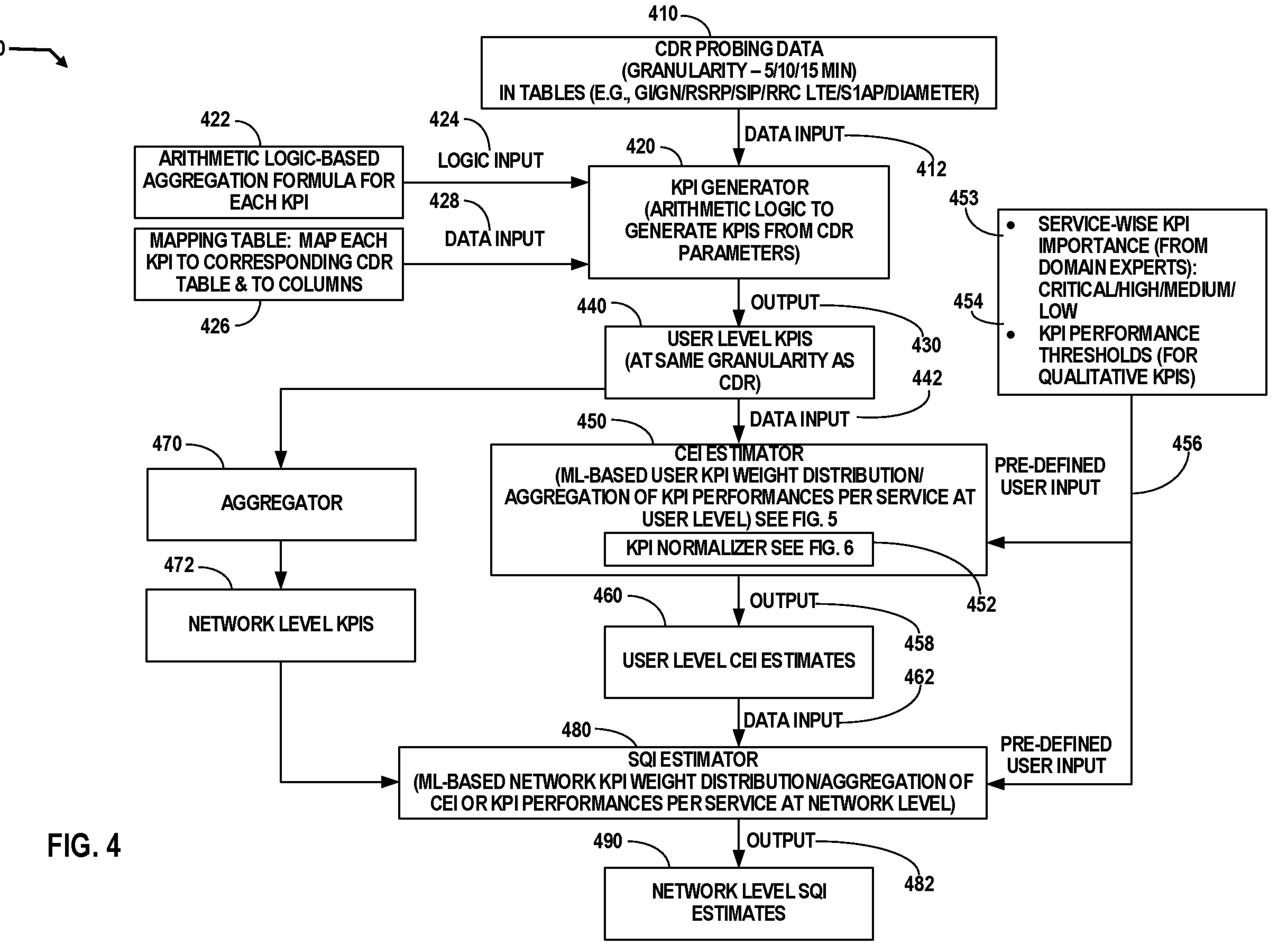
FIG. 4 is a functional block diagram of a Smart Service Analyzer according to some embodiments.

FIG. 4 is a functional block diagram of a Smart Service Analyzer 400 according to some embodiments.

In FIG. 4, Smart Service Analyzer 400 implements a KPI Normalizer 452 at CEI Estimator 450. KPI Normalizer 452 normalizes KPI values in a performance Range between 0 and 100%. CDR Probing Data 410 from the probing devices in the network architecture is provided as Input 412 to a KPI Generator 420. A probe is a device or software that acts as a messenger and converts network communications into an analyzable format. Probes are used to analyze network traffic and obtain reliable insight into the subscriber experience, analyze the performance and behavior of network components in a dynamic environment via KPIs, and troubleshoot issues on the network and identify root cause of the issue by generating CDR Probing Data 410 per session per subscriber.

CDR Probing Data 410 is provided to the KPI Generator 420 in tables. The CDR Probing Data 410 is provided at a predetermined granularity, e.g., 5 minutes, 10 minutes, 15 minutes, or other granularity within the scope of the embodiments. CDR Probing Data further has different categories. The categories include GI interface, GN interface, Reference Signal Received Power (RSRP), Session Initiation Protocol (SIP), Radio Resource Control (RRC) LTE, S2 Application Protocol (S2AP), Diameter interface, or other categories within the scope of the embodiments. The different types of probing data obtained from different types of network modules are accumulated. Previously, user's historical probing data was used instead of the User Level KPIs.

As mentioned above, the Customer Experience Index is referred to as CEI Estimates and the Network Level Index is referred to as Service Quality Index (SQI) Estimates, which are produced using KPIs. KPIs are first calculated from the CDR Probing Data 410. KPI Generator 420 receives an arithmetic logic-based Aggregation Formula 422 for KPIs that are provided as Logic Input 424 to KPI Generator 420. The Aggregation Formulas 422 are further provided by network engineers. Mapping information is provided by Mapping Table 426 that is provided as Data Input 428 to KPI Generator 420. Mapping Table 426 is provided by network engineers. The Mapping Table 424 maps a KPI to a corresponding CDR table and columns in the CDR table of CDR Probing Data 410. KPI Generator 420 runs arithmetic operations that use multiple columns of a table in CDR Probing Data 410 and maps which columns to apply arithmetic operation for which KPI, e.g., which columns in tables of CDR Probing Data 410 to use for which KPI. KPI Generator 420 applies arithmetic logic-based Aggregation Formula 422 for a KPI to generate the KPIs from the CDR Probing Data 410.

After running the arithmetic operations, the KPI Generator 420 produces as Output 430 the User Level KPIs 440. The User Level KPIs 440 is at the same granularity as the CDR Probing Data 410. User Level KPIs 440 are provided as Data Input 442 to CEI Estimator 450.

In FIG. 4, CEI Estimator 450 applies ML to produce User Level CEI Estimates 460 at the service level based on the User Level KPIs 440. KPIs are divided into two categories: Qualitative KPIs and Quantitative KPIs. CEI Estimator 450 includes KPI Normalizer 452, which normalizes KPI values in a performance Range between 0 and 100%. Qualitative KPIs are scaled directly between 0 and 100% using predefined performance thresholds, such as Success-rate or Failure rate. Quantitative KPIs do not have any Performance Threshold, such as Release Cause Count or Data Traffic Throughput. In general, Quantitative KPIs do not have any qualitative range of values. Instead, Quantitative KPIs rely on what is the current quantity of those KPI values. For example, throughput to a device, success count or failure count of connectivity between two devices, or other KPIs within the scope of the embodiments. Counts or bandwidth information from throughput information are quantities.

Service-Wise KPI Importance 453, such as Critical, High, Medium, and Low Indicators, and KPI Performance Thresholds 454 for Qualitative KPIs are provided to the CEI Estimator 450 as Pre-Defined User Input 456 to CEI Estimator 450. The Service-Wise KPI Importance 453 is developed by experts, such as domain experts, network engineers, managers, or other experts within the scope of the embodiments. Experts such as network engineers do not provide information regarding KPI weight distribution. However, network engineers provide insight on KPI Importance 453. Quantitative KPI Performance Thresholds 454 are dynamically updated by analyzing trend shifts. KPI Performance Thresholds 454 refer to what extent of values represent a good KPI value or a bad KPI value. Sometimes KPI Performance Thresholds 454 are predefined by network engineers, while at other times KPI Performance Thresholds 454 are to be dynamic and are thus based on the trends. Thus, in response to a trend deviating from a band, new KPI Performance Thresholds 454 are created based on the shift of the trend. The dynamically updating of the KPI Performance Thresholds 454 based on trends is further automated. In response to a trend shift, stakeholders are sent automatic emails indicating that the trend has shifted, and the thresholds are to be updated. Thus, the stakeholders review this information and confirm the trend shift.

Based on the Service-Wise Importance 453 and the KPI Performance Thresholds 454, CEI Estimator 450 applies ML to produce as Output 458 User Level CEI Estimates 460.

CEI Estimator 450 automatically estimates the priority of the User Level KPIs 440 in a service. Inside one service there could be several User Level KPIs 440 and which of the several User Level KPIs 440 are the highest priority is automatically estimated using ML.

CEI Estimator 450 applies ML to estimate KPI Weight Distribution for the services. The CEI Estimator 450 aggregates KPI performance per service at the user level. Thus, CEI Estimator 450 generalizes User Level CEI Estimates 460. Generalizing User Level CEI Estimates 460 results in no change or modification in response to a KPI being added or removed from a particular service. Previously, different types of predefined rule-based algorithms were changed in response to a KPI being removed from some service or added to a service. KPI trend shift events are detected, and alarms are automatically emailed to stakeholders or other experts, such as domain experts, network engineers, managers, etc.

Figure 5:
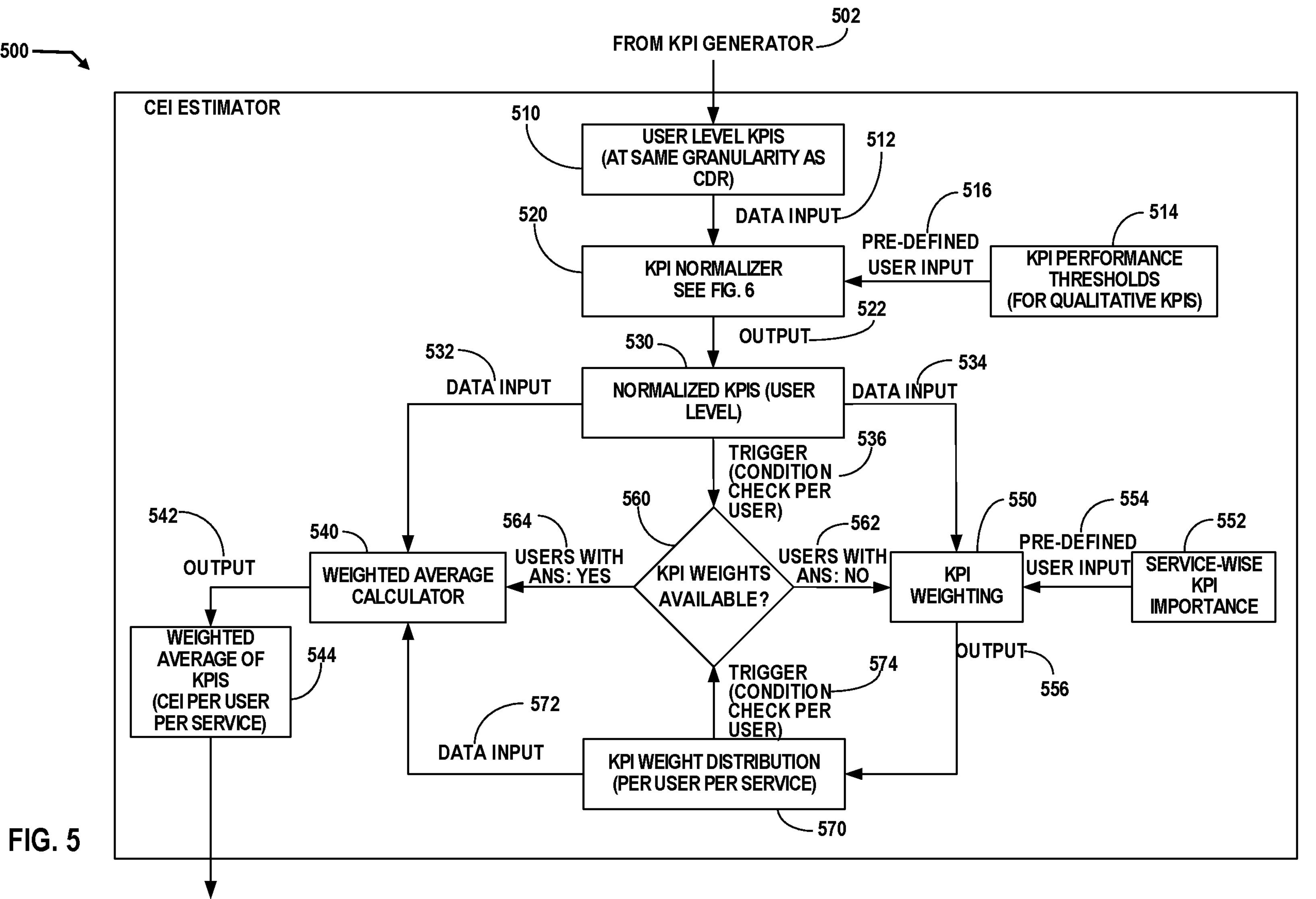
FIG. 5 is a block diagram of a CEI Estimator according to some embodiments.

CEI Estimator 450 is discussed in detail in FIG. 5.

FIG. 5 is a block diagram of a CEI Estimator 500 according to some embodiments.

In some embodiments, CEI Estimator 500 is similar to CEI Estimator 450 (FIG. 4). In FIG. 5, CEI Estimator 500 implements a KPI Normalizer that normalizes KPI values in a performance Range between 0 and 100%. CEI Estimator 500 receives User Level KPIs 510 from KPI Generator 502, which was illustrated earlier with respect to KPI Generator 420 providing User Level KPIs 440 to CEI Estimator 450 in FIG. 4. User Level KPIs 510 are provided as Data Input 512 to KPI Normalizer 520. In some embodiments, KPI Normalizer 520 is similar to KPI Normalizer 452. KPI Performance Thresholds (for Qualitative KPIs) 514 are further provided as Pre-Defined User Input 516 to KPI Normalizer 520. A more detailed discussion of KPI Normalizer 520 is discussed in FIG. 6.

Figure 6:
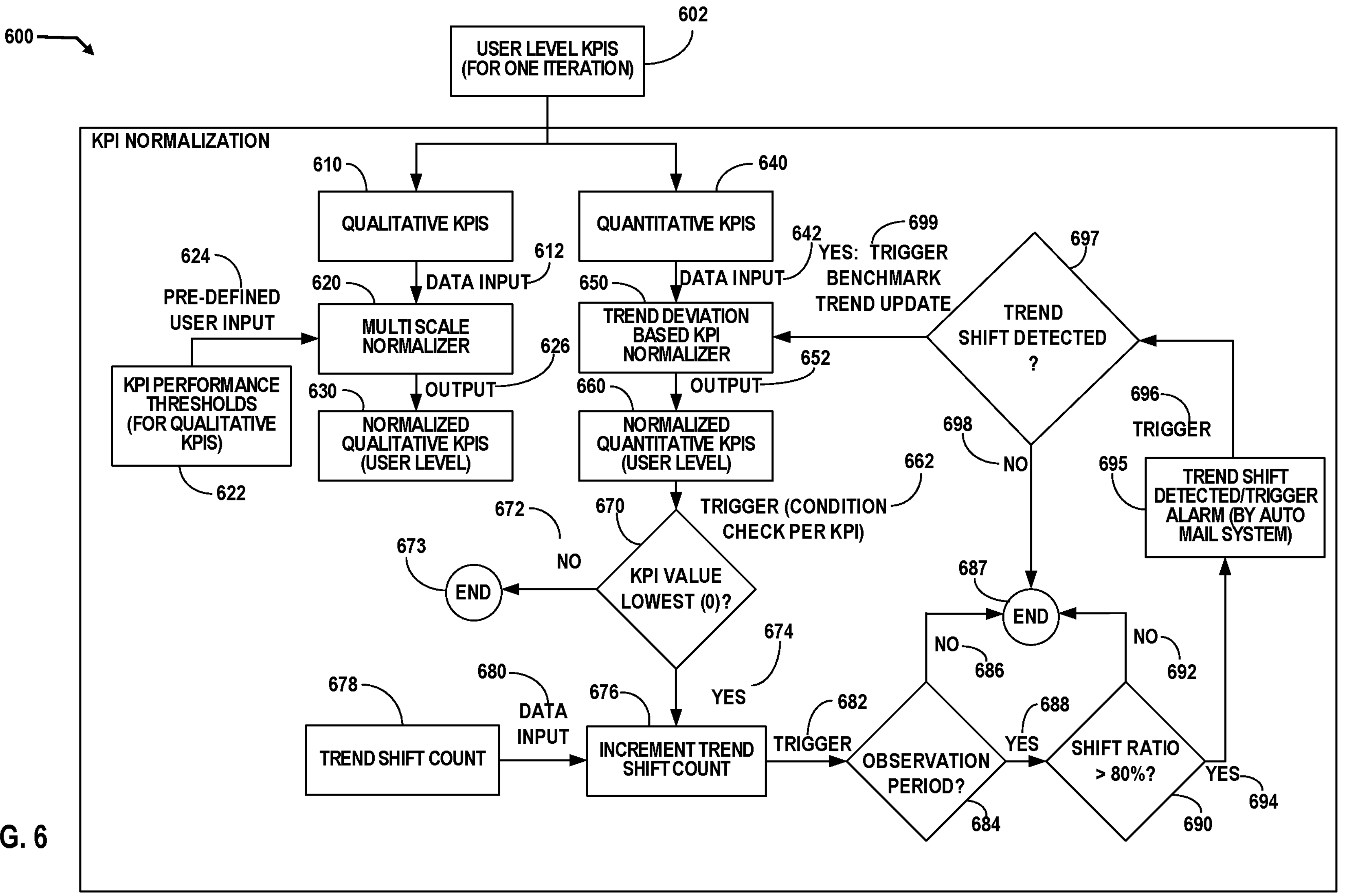
FIG. 6 is a block diagram of KPI Normalizer according to some embodiments.

FIG. 6 is a block diagram of KPI Normalizer 600 according to some embodiments.

In some embodiments, KPI Normalizer 600 is similar to KPI Normalizer 520 (FIG. 5) and/or KPI Normalizer 452 (FIG. 4). In FIG. 6, User Level KPIs 602 are provided to KPI Normalizer 600. KPI Normalizer 600 receives and normalizes Qualitative KPI values 610 and Quantitative KPI values 640 in a performance Range between 0 and 100%.

Qualitative KPIs 610 are provided as Data Input 612 to Multi Scale Normalizer 620. KPI Performance Thresholds 622 for Qualitative KPIs 610 are provided as Pre-Defined User Input 624 to Multi Scale Normalizer 620, which normalizes Qualitative KPIs 610 based on multiple thresholds. The KPI Performance Thresholds 622 for the Qualitative KPIs 610 are provided by the experts, such as domain experts, network engineers, managers, or other experts within the scope of the embodiments. Multi Scale Normalizer 620 normalizes the Qualitative KPI values 610 using the KPI Performance Thresholds 622. Qualitative KPI values 610 are values such as good or bad, which the domain experts have knowledge of such values. Qualitative KPI values 610 are further based on the expectation of the management. For example, network engineers or managers provide an indication that a predetermined Qualitative KPI value 610 is to be within a predetermined range, e.g., 90%. The expectation of network engineers or managers is that the predetermined Qualitative KPI value 610 is to be equal to or greater than 90% because this range is considered to provide a predetermined level of performance or is critical to operation of the network. The KPI Performance Thresholds 622 thus depend on the perspective of the network engineer and what is considered good or bad. Accordingly, the KPI Performance Thresholds 622 are received, and Multi Scale Normalizer 620 normalizes the Qualitative KPI values 610 based on the KPI Performance Thresholds 622. Normalized Qualitative KPI values are generalized and are changed by modifying the KPI Performance Thresholds 622. The Multi Scale Normalizer 620 automatically adapts to changes. Multi Scale Normalizer 620 normalizes the Qualitative KPI values 610 based on a KPI value being within a range of the KPI Performance Thresholds 622.

Multi Scale Normalizer 620 provides as Output 626 Normalized Qualitative KPIs 630 at the user level. User Level Quantitative KPIs 640 are provided as Data Input 642 to Trend Deviation Based KPI Normalizer 650. The insight provided by the KPI Performance Thresholds 622 for Qualitative KPIs 610 is not applicable to User Level Quantitative KPI values 640. Thresholds are unavailable because User Level Quantitative KPIs 640 are based on trend data. Benchmark Trend Update 699 represents a benchmark trend shift in Quantitative KPI values. The Quantitative KPI values 640 shift at any time. The Benchmark Trend Update 699 is usable by Trend Deviation Base KPI Normalizer 650 to estimate the thresholds and to map those values in between 0 to 100. Thus, Trend Deviation Based KPI Normalizer 650 normalizes User level Quantitative KPIs based on their deviations from the network level Benchmark Trend Update 699.

Trend Deviation Based KPI Normalizer 650 provides as Output 652 Normalized Quantitative KPIs 660 (at the user level). However, there are factors that affect Trend Deviation Based KPI Normalizer 650. The Output 652 of Normalized Quantitative KPIs 660 initiates a Trigger 662, wherein a Decision 670 determines whether a KPI is a predetermined KPI lowest value (0).

Values not having KPI lowest value (0) result in an answer of "No" 672 and the normalization activity Ends 673. The Normalized Quantitative KPI Values 660 and the Normalized Qualitative KPI Values 630 are provided for determination of Customer Experience Index (CEI) Estimates of a Weighted Average of KPIs (CEI Per User Per Service) as shown in FIG. 5.

In response to the KPI values being Zero (0) 674, Normalized Quantitative KPI values 660 are provided to Increment Trend Shift Count 676. A variable called Trend Shift Count 678 is provided as Data input 680 to Increment Trend Shift Count 676. Trend Shift Count 678 is a number of iterations with normalized KPI value being equal to Zero (0).

Once the Increment Trend Shift Count 676 is incremented, Trigger 682 is issued, and a check is performed to determine whether an Observation Period Has Passed 684. Thus, for the Trend Shift Count Increments 676, the observation period is checked to determine whether the Observation Has Passed 684. The observation period is 1 day, or a certain period of days.

In response to the Observation Period Not Passing 686, the process Ends 687, e.g., nothing happens because the KPI value is 0 by nature. In response to the Observation Period Being Passed 688, a check is made whether the Shift Ratio is greater than a predetermined shift ratio value 690, such as 80%. Shift Ratio is the ratio of Trend Shift Count 678 with respect to Total Number of Iterations (during Observation Period for any N, e.g., 1 or 2 or 3 consecutive days). In response to the Shift Ratio not being greater than 80% 692, the process Ends 687.

In response to the Shift Ratio being greater than 80% 694, a Trend Shift is detected 694. A Shift Ratio greater than 80% results in a Trend Shift Detected. Shift Ratio is a ratio of Trend Shift Count 678 with respect to Total Number of Iterations, e.g., (Trend Shift Count)/(Total Number of Iterations). For example, the Trend Shift Count 678 is 20, and the Observation Period is 1 day. Thus, within 1 day, 24 iterations occur and within those 24 iterations, 20 zeros occur. In response to having 20 zeros, the KPI lowest value of 20 occurs within this 24-hour range. Then, the Trend Shift Ratio is above 80%, i.e., 20/24=83.33%. Thus, the trend data does not fall within the expected bandwidth. However, the Normalized Quantitative KPIs 660 are outside of the expected trends zone or band because the Normalized Quantitative KPIs 660 are legitimately bad for one or two iterations. In response to the KPI values in many iterations within the observation range being out of band, a Trend Shift is Detected 694, and the current trend is no longer following within the predefined band. In response to Trend Shift being Detected 694, an Alarm is Triggered and sent by the Auto Mail System 695. KPI Trend Shift events are automatically emailed to stakeholders or other experts, such as domain experts, network engineers, managers, or other experts within the scope of the embodiments.

Trigger 696 is issued, and Decision 697 determines whether the Trend Shift has been Detected for the Last 3 (or any N) Consecutive Observation Periods. The trend deviation is detected due to an accidental trend deviation, where there is a significant incident that occurs. For example, people are located in a crowded location or gathered in an area where some specific event is happening within 1 day. However, after 1 day that event ends, and traffic reverts back to normal levels. In that scenario, a Trend Shift was detected but the Trend Shift is a limited incident. Thus, in response to the Trend Shift not being Detected for the Last 3 (or any N) Consecutive Observation Periods 698, the Quantitative Normalization process Ends 698.

In contrast, in response to the trend shift being detected for several consecutive observation periods, such as for 2-3 observation periods, the general trend is identified as having shifted. Thus, in response to the Trend Shift having been Detected for the Last 3 (or any N) Consecutive Observation Periods, a Benchmark Trend Update 699 is generated and provided to the Trend Deviation Based KPI Normalizer 650 to generate Normalized Quantitative KPIs 660 that are adjusted based on the Benchmark Trend Update 699.

Figure 7:
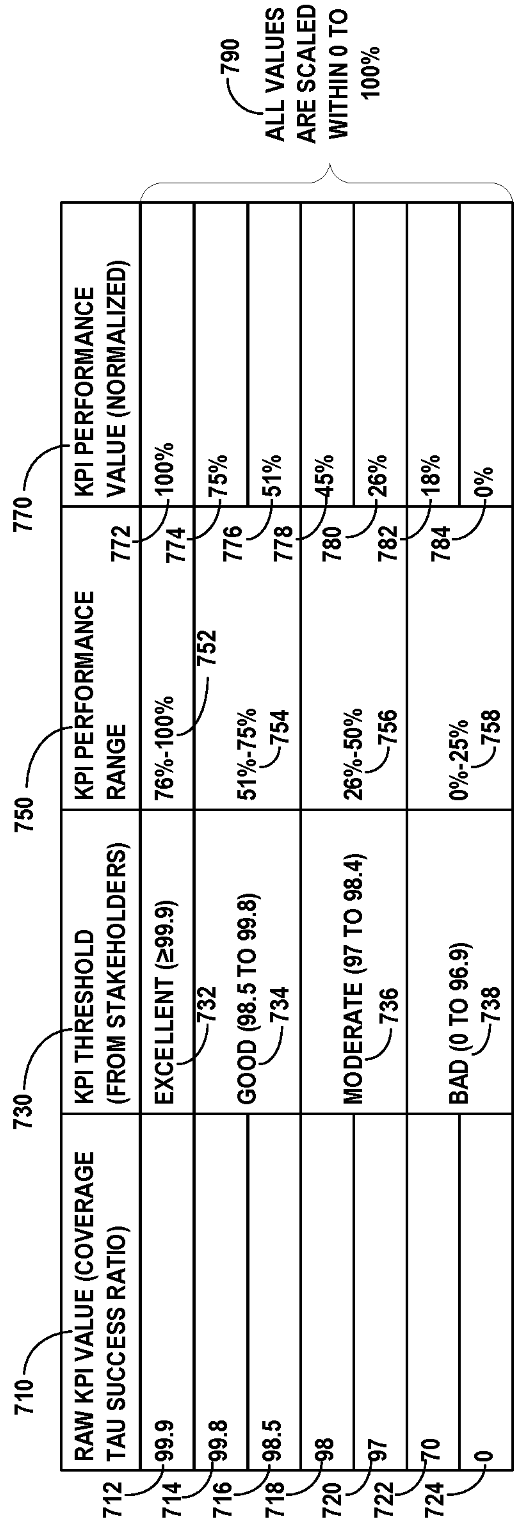
FIG. 7 is a table showing the Normalization of Raw KPI Values according to some embodiments.

FIG. 7 is table 700 showing the Normalization of Raw KPI Values according to some embodiments.

In FIG. 7, the first column is the Raw KPI Value for Coverage TAU Success Ratio 710. Next, a value for KPI Thresholds 730 is shown. The value for KPI Thresholds 730 is provided by Stakeholders. Next, KPI Thresholds 730 are transformed into KPI Performance Range 750, Then, Normalized KPI Performance Values 770 are shown.

As shown in FIG. 7, the Raw KPI Value for Coverage TAU Success Ratio 710 ranges from 0 to 99.9. For a Raw KPI Value 710 of 99.9 712, the KPI Threshold 730 is Excellent 732, which falls within the KPI Performance Range 750 of 76% to 100% 752. The Normalized KPI Performance Value 770 is 100% 772.

For a Raw KPI Value 710 of 99.8 714 and 98.5 716, the KPI Threshold 730 is Good 734, which falls within the KPI Performance Range 750 of 51% to 75% 754. The Normalized KPI Performance Value 770 is 75% 774 and 51% 776, respectively.

For a Raw KPI Value 710 of 98 718 and 97 720, the KPI Threshold 730 is Moderate 736, which falls within the KPI Performance Range 750 of 26% to 50% 756. The Normalized KPI Performance Value 770 is 45% 778 and 26% 780, respectively.

For a Raw KPI Value 710 of 70 722 and 0 724, the KPI Threshold 730 is Bad 738, which falls within the KPI Performance Range 750 of 0% to 25% 758. The Normalized KPI Performance Value 770 is 18% 782 and 0% 784, respectively.

Accordingly, FIG. 7 shows that the RAW KPI Values 710 are normalized within the range of 0% to 100% 790.

In FIG. 5 KPI Normalizer 520 provides as Output 522 Normalized KPIs 530, such as Normalized Qualitative KPIs 630 and Normalized Quantitative KPIs 660 (FIG. 6). Qualitative KPIs are scaled directly in between 0 to 100% using the KPI Performance Thresholds 514, e.g., Success-rate or Failure rate. Quantitative KPIs that do not have any Performance Threshold include Release Cause Count, Data Traffic Throughput, or other quantitative KPIs within the scope of the embodiments. KPI Normalizer 520 normalizes qualitative and quantitative KPI values in a performance Range (between 0 and 100%). Normalized KPIs 530 are provided as Data Input 532 to Weighted Averaging operation 540 and as Data Input 534 to KPI Weighting operation 550. KPI Weighting operation 550 receives Service-Wise KIP Importance 552 as Pre-Defined User Input 554. Trigger 536 is provided for Decision 560. Decision 560 determines whether KPI Weights are available. In response to KPI Weights being unavailable 562, KPI Weighting operation 550 is triggered and provides Output 556 to KPI Weight Distribution 570. KPI Weighting operation 550 provides as Output estimates of KPI weight distribution for any service. KPI Weight Distribution 570 is provided as Data Input 572 to Weighted Averaging operation 540. KPI Weight Distribution 570 provides Trigger 574 to Decision 560 for again determining whether KPI Weights are available. In response to KPI Weights being available 564, Weighted Average operation 550 provides an Output 542 of Weighted Average of KPIs 544.

Figure 8A:
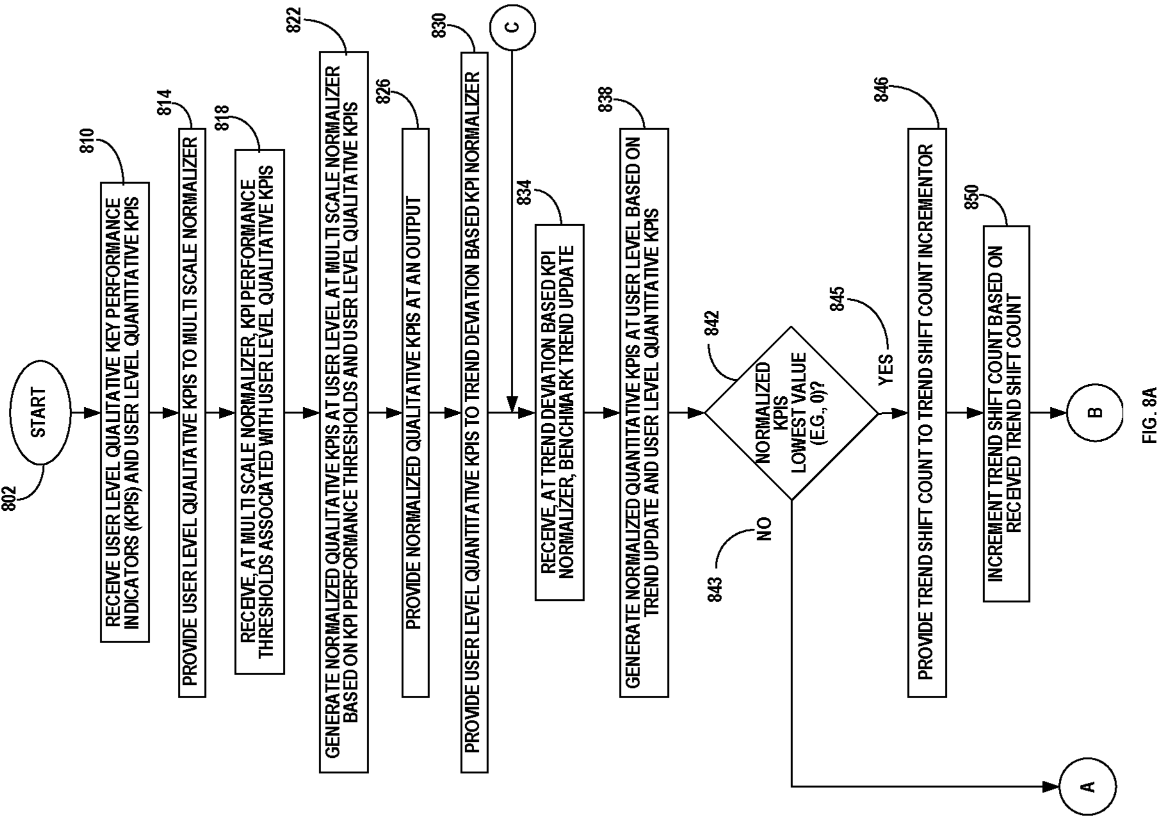
FIGS. 8A-B is a flowchart of a method for providing a Key Performance Indicator (KPI) Normalizer for a Smart Service Analyzer according to some embodiments.
Figure 8A:
Figure 8B:
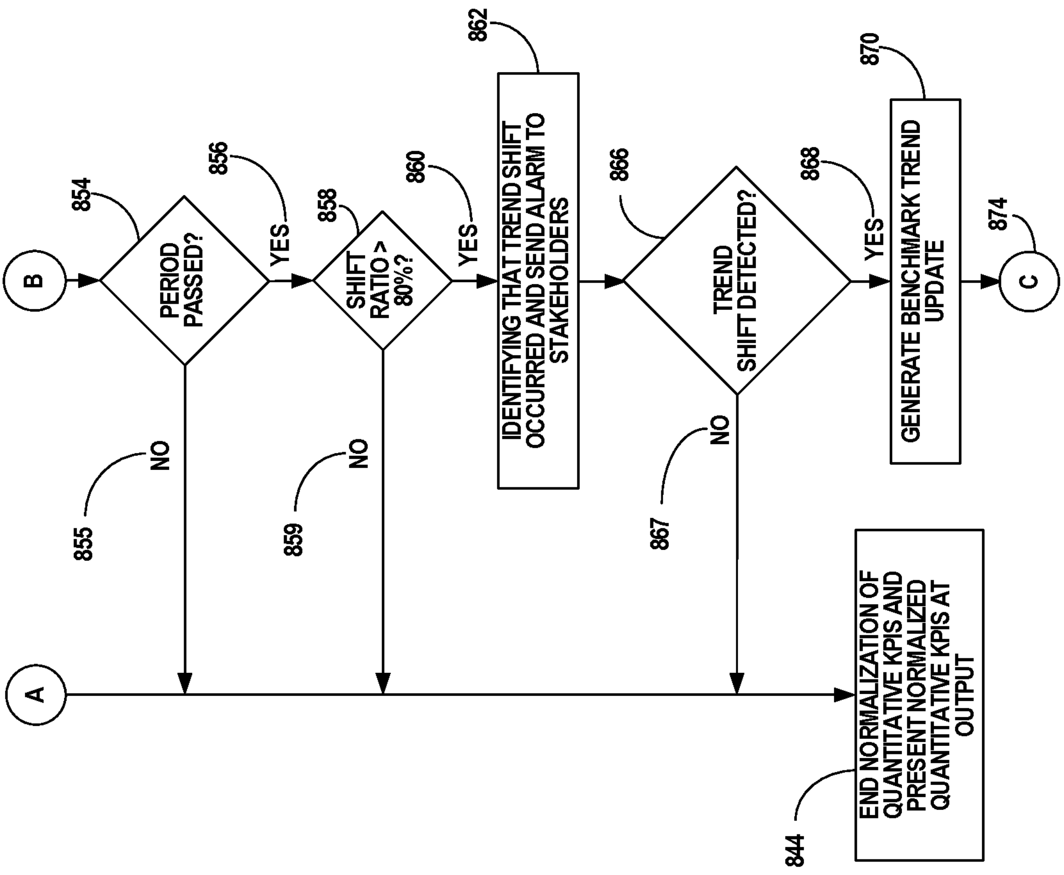
Figure 8B:

FIGS. 8A-B are flowchart 800 of a method for providing a Key Performance Indicator (KPI) Normalizer for a Smart Service Analyzer according to some embodiments.

In FIGS. 8A-B, the process starts at operation 802 and user level Qualitative Key Performance Indicators (KPIs)

and User Level Quantitative KPIs are received at operation 810. Referring to FIG. 6, KPI Normalizer 600 receives and normalizes Qualitative KPI values 610 and Quantitative KPI values 640 in a performance Range between 0 and 100%.

The User Level Qualitative KPIs are provided to a Multi Scale Normalizer at operation 814. Referring to FIG. 6, Qualitative KPIs 610 are provided as Data Input 612 to Multi Scale Normalizer 620. KPI Performance Thresholds 622 for Qualitative KPIs 610 are provided as Pre-Defined User Input 624 to Multi Scale Normalizer 620, which normalizes Qualitative KPIs 610 based on multiple thresholds. The KPI Performance Thresholds 622 for the Qualitative KPIs 610 are provided by experts, such as domain experts, network engineers, managers, or other experts within the scope of the embodiments. Qualitative KPI values 610 are values such as good or bad, which the domain experts have knowledge of such values. Qualitative KPI values 610 are based on the expectation of the management. For example, network engineers or managers provide an indication that a predetermined Qualitative KPI value 610 is to be within a predetermined range, e.g., 90%. The expectation of network engineers or managers is that the predetermined Qualitative KPI value 610 is to be equal to or greater than 90% because this range is considered to provide a predetermined level of performance or is critical to operation of the network.

KPI Performance Thresholds associated with the User Level Qualitative KPIs are received at the Multi Scale Normalizer at operation 818. Referring to FIG. 6, KPI Performance Thresholds 622 are received, and Multi Scale Normalizer 620 normalizes the Qualitative KPI values 610 based on the KPI Performance Thresholds 622.

Normalized Qualitative KPIs are generated at the user level at the Multi Scale Normalizer based on the KPI Performance Thresholds and the User Level Qualitative KPIs at operation 822. Referring to FIG. 6, Multi Scale Normalizer 620 normalizes the Qualitative KPI values 610 using the KPI Performance Thresholds 622.

The Normalized Qualitative KPIs are provided at an output at operation 826. Referring to FIG. 6, Multi Scale Normalizer 620 provides as Output 626 Normalized Qualitative KPIs 630 at the user level.

The User Level Quantitative KPIs are provided to a Trend Deviation Based KPI Normalizer at operation 830. Referring to FIG. 6, Quantitative KPIs 640 are provided as Data Input 642 to Trend Deviation Based KPI Normalizer 650.

A Benchmark Trend Update is received at Trend Deviation Based KPI Normalizer at operation 834. Referring to FIG. 6, the insight provided by the KPI Performance Thresholds 622 for Qualitative KPIs 610 is not applicable to Quantitative KPI values 640. Thresholds are unavailable because Quantitative KPIs 640 are based on trend data. Benchmark Trend Update 699 represents a benchmark trend shift in Quantitative KPI values. The Quantitative KPI values 640 shift at any time. The Benchmark Trend Update 699 is usable by Trend Deviation Base KPI Normalizer 650 to estimate the thresholds and to map those values in between 0 to 100.

Normalized Quantitative KPIs are generated at the user level based on the Trend Update and User Level Quantitative KPIs at operation 838. Referring to FIG. 6, Trend Deviation Based KPI Normalizer 650 normalizes User level Quantitative KPIs based on their deviations from the network level Benchmark Trend Update 699. Trend Deviation Based KPI Normalizer 650 provides as Output 652 Normalized Quantitative KPIs 660 (at the user level).

A decision is made whether the Normalized Quantitative KPIs are lowest predetermined value (e.g., 0) at operation 842. Referring to FIG. 6, The Output 652 of Normalized Quantitative KPIs 660 initiates a Trigger 662, wherein a Decision 670 determines whether a KPI is a predetermined KPI lowest value (0).

In response to KPIs not being a predetermined KPI lowest value (0) at operation 843, normalization activity Ends at operation 844. Referring to FIG. 6, Values not having KPI lowest value (0) result in an answer of No 672 and the normalization activity Ends 673. The Normalized Quantitative KPI Values 660 and the Normalized Qualitative KPI Values 630 are provided for determination of Weighted Average of KPIs (CEI Per User Per Service) as shown in FIG. 5.

In response to KPIs being a predetermined KPI lowest value (0) at operation 845, a Trend Shift Count is provided to a Trend Shift Count Incrementor at operation 846. Referring to FIG. 6, In response to the KPI values being Zero (0) 674, Normalized Quantitative KPI values 660 are provided to Increment Trend Shift Count 676. A variable called Trend Shift Count 678 is provided as Data input 680 to Increment Trend Shift Count 676. Trend Shift Count 678 is a number of iterations with normalized KPI value being equal to Zero (0).

A Trend Shift Count is incremented based on the Received Trend Shift Count at operation 850. Referring to FIG. 6, the Increment Trend Shift Count 676 is incremented.

A determination is made whether a Predetermined Observation Period has passed at operation 854. Referring to FIG. 6, Trigger 682 is issued, and a check is performed to determine whether an Observation Period Has Passed 684. Thus, for the Trend Shift Count Increments 676, the observation period is checked to determine whether the Observation Has Passed 684. The observation period is 1 day, or a certain period of days.

In response to the Predetermined Observation Period not having passed at operation 855, the process Ends at operation 844. Referring to FIG. 6, In response to the Observation Period Not Passing 686, the process Ends 687, e.g., nothing happens because the KPI value could be 0 by nature.

In response to the Predetermined Observation Period having passed at operation 856, a determination is made whether a Shift Ratio>80% at operation 858. Referring to FIG. 6, in response to the Observation Period Being Passed 688, a check is made whether the Shift Ratio is greater than a predetermined shift ratio value 690, such as 80%. Shift Ratio is the ratio of Trend Shift Count 678 with respect to Total Number of Iterations (during Observation Period for any N, e.g., 1 or 2 or 3 consecutive days).

In response to the Shift Ratio not being greater than 80% at operation 859, the process ends at operation 844. Referring to FIG. 6, in response to the Shift Ratio not being greater than 80% 692, the process Ends 687.

In response to the Shift Ratio being greater than 80% at operation 860, a trend shift is identified as occurring and an alarm is sent to stakeholders at operation 862. Referring to FIG. 6, in response to the Shift Ratio being greater than 80% 694, a Trend Shift is detected 694. A Shift Ratio greater than 80% results in a Trend Shift Detected. Shift Ratio is a ratio of Trend Shift Count 678 with respect to Total Number of Iterations, e.g., $$\frac{\text{Trend Shift Count}}{\text{Total Number of Iterations}}.$$

For example, the Trend Shift Count 678 is able to be 20, and the Observation Period is able to be 1 day. Thus, within 1 day, 24 iterations are able to occur and within those 24 iterations, 20 zeros could occur. In response to having 20 zeros, the KPI lowest value of 20 occurs within this 24-hour range. Then, the Trend Shift Ratio is above 80%, i.e., $$\frac{20}{24} = 83.33\%.$$

Thus, the trend data does not fall within the expected bandwidth. However, the Normalized Quantitative KPIs 660 are able to be outside of the expected trends zone or band because the Normalized Quantitative KPIs 660 are legitimately bad for one or two iterations. In response to the KPI values in many iterations within the observation range being out of band, a Trend Shift is Detected 694, and the current trend is no longer following within the predefined band. In response to Trend Shift being Detected 694, an Alarm is Triggered and sent by the Auto Mail System 695. KPI Trend Shift events are able to be automatically emailed to stakeholders or other experts, such as domain experts, network engineers, managers, etc.

Next, a determination is made whether a trend shift was detected for the last 3 consecutive observation periods at operation 866. Referring to FIG. 6*s*, Trigger 696 is issued, and Decision 697 determines whether the Trend Shift has been Detected For the Last 3 (or any N) Consecutive Observation Periods. The trend deviation is able to be detected due to an accidental trend deviation, where there is a significant incident that occurs. For example, people are able to be located in a crowded location or gathered in an area where some specific event is happening within 1 day. However, after 1 day that event ends, and traffic reverts back to normal levels. In that scenario, a Trend Shift was detected but the Trend Shift is a limited incident.

In response to the Trend Shift not being Detected for the Last 3 (or any N) Consecutive Observation Periods at operation 867, the Quantitative Normalization process Ends at operation 844. Referring to FIG. 6, in response to the Trend Shift not being Detected for the Last 3 (or any N) Consecutive Observation Periods 698, the Quantitative Normalization process Ends 698.

In response to the Trend Shift being Detected for the Last 3 (or any N) Consecutive Observation Periods at operation 868, a Benchmark Trend Update is generated at operation 870. Referring to FIG. 6, in response to the trend shift being detected for several consecutive observation periods, such as for 2-3 observation periods, the general trend is identified as having shifted. Thus, in response to the Trend Shift having been Detected for the Last 3 (or any N) Consecutive Observation Periods, a Benchmark Trend Update 699 is generated and provided to the Trend Deviation Based KPI Normalizer 650.

Benchmark Trend Update is provided back to the Trend Deviation Based KPI Normalizer to generate adjusted Normalized Quantitative KPIs at operation 874. Referring to FIG. 6, in response to the Trend Shift having been Detected for the Last 3 (or any N) Consecutive Observation Periods, a Benchmark Trend Update 699 is generated and provided to the Trend Deviation Based KPI Normalizer 650 to generate Normalized Quantitative KPIs 660 that are adjusted based on the Benchmark Trend Update 699. The Normalized Quantitative KPI Values 660 and the Normalized Qualitative KPI Values 630 are provided for determination of Customer Experience Index (CEI) Estimates of Weighted Average of KPIs (CEI Per User Per Service) as shown in FIG. 5.

At least one embodiment of the method includes normalizing one or more key performance indicator (KPI). The one or more KPI include user-level quantitative KPI or user-level qualitative KPI. Whether weights are available for each normalized KPI are determined. In response to the weights being available for each normalized KPI, based on the weights for each normalized KPI, each normalized KPI is converted to a customer experience index (CEI) for each user and for each network service. The method further includes determining whether a trend shift has occurred based on the CEI; and automatically generating an alert in response to a determination that the trend shift occurred.

In FIG. 4, User Level CEI Estimates 460 from CEI Estimator 450 are provided as Input 462 to SQI Estimator 480. In some embodiments, CEI Estimates 460 is similar to Weighted Average of KPIs 544 (e.g., CEI per user per service FIG. 5). User Level KPIs 440 are provided to an Aggregator 470 for aggregation to produce Network Level KPIs 472. Once the User Level KPIs are aggregated by Aggregator 470 at the network level to produce Network Level KPIs 472, the Network Level KPIs 472 are further provided to SQI Estimator 480.

Similar to the CEI Estimator 450, SQI Estimator 480 applies ML to the Network Level KPIs 472 and the User Level CEI Estimates 460 to produce Network Level SQI Estimates 490 at Output 482 of SQI Estimator 480.

SQI Estimator 480 produces Network Level SQI Estimates 490 that include Network KPI Weight Distribution and aggregation of User Level CEI Estimates 460 and/or Network Level KPIs 472 per service. Again, Pre-Defined User Input 456 is forwarded to the SQI Estimator 480 from the expert regarding the Service-Wise KPI Importance 453 and KPI Performance Thresholds 454. Experts include domain experts, network engineers, managers, or other experts within the scope of the embodiments. SQI Estimator 480 calculates or estimates Network Level SQI Estimates 490 in two ways. First, SQI Estimator 480 uses the Data Input 462 of User Level CEI Estimates 460 from the CEI Estimator 460 and applies ML to estimate the Network Level SQI Estimates 490. Alternatively, SQI Estimator 480 uses the User Level KPIs aggregated at the network level to produce the Network Level KPIs 472 and applies ML to calculate Network SQI Estimates 490.

Figure 9:
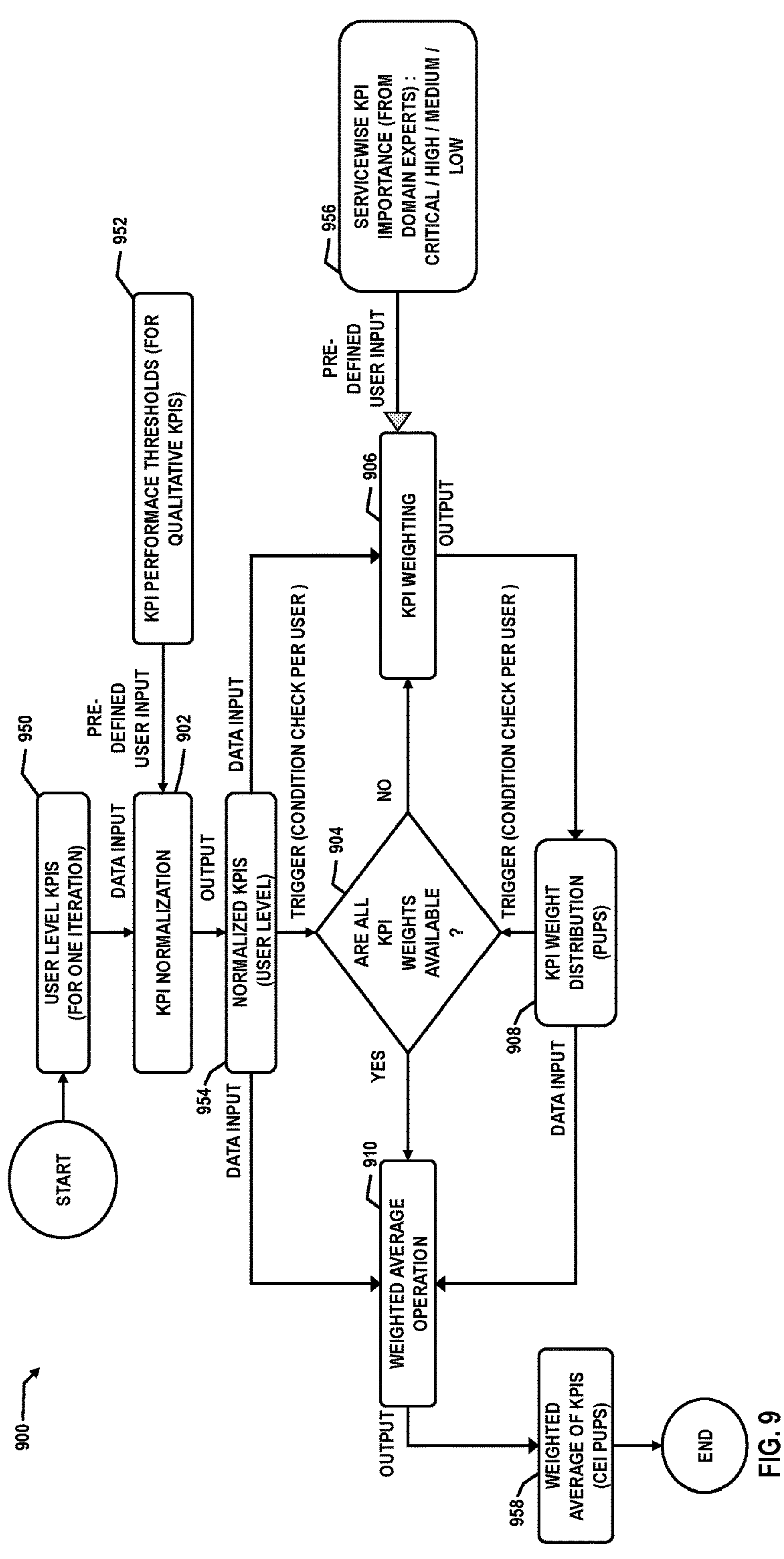
FIG. 9 is a flowchart of a method for estimating customer experience index (CEI), according to some embodiments.

FIG. 9 is a flowchart of a method for estimating customer experience index (CEI) 900, according to some embodiments.

In some embodiments, method for estimating CEI 900 describes process tasks for estimating service level CEI for each user from the user's respective KPI values as part of a smart service analyzer architecture. While the operations of method for estimating CEI 900 are discussed and shown as having a particular order, each operation in method for estimating CEI 900 is configured to be performed in any order unless specifically called out otherwise. method for estimating CEI 900 is implemented as a set of operations, such as operations 902 through 910.

At operation 902 of method for estimating CEI 900, KPI normalization is performed. User Level KPIs (based on one iteration) 950 are received by a KPI normalization algorithm, such as method for providing a Key Performance Indicator (KPI) Normalizer for a Smart Service Analyzer 800. In some embodiments, such as FIG. 4, the User Level KPIs 440 are Output 430 that KPI Generator 420 produces. The User Level KPIs 440 are at the same granularity as the CDR Probing Data 410. User Level KPIs 440 are provided as Data Input 442 to CEI Estimator 450. In some embodiments, such as FIG. 5, CEI Estimator 500 receives User Level KPIs 510 from KPI Generator 502. User Level KPIs 510 are provided as Data Input 512 to KPI Normalizer 520.

KPI performance thresholds (for qualitative KPIs) are further received by the KPI normalization algorithm. In some embodiments, such as FIG. 4, thresholds 454 are dynamically updated by analyzing trend shifts. KPI Performance Thresholds 454 refer to what extent of values represent a good KPI value or a bad KPI value. Sometimes KPI Performance Thresholds 454 are predefined by network engineers, while at other times KPI Performance Thresholds 454 are to be dynamic and are thus based on the trends. Thus, in response to a trend deviating from a band, new KPI Performance Thresholds 454 are created based on the shift of the trend. The dynamically updating of the KPI Performance Thresholds 454 based on trends is further automated. In response to a trend shift, stakeholders are sent automatic emails indicating that the trend has shifted, and the thresholds are to be updated. Thus, the stakeholders review this information and confirm the trend shift.

In some embodiments, such as FIG. 5, qualitative KPIs are scaled directly in between 0 to 100% using the KPI Performance Thresholds 514, e.g., Success-rate or Failure rate. Quantitative KPIs that do not have any Performance Threshold include Release Cause Count, Data Traffic Throughput, or other quantitative KPIs within the scope of the embodiments. KPI Normalizer 520 normalizes qualitative and quantitative KPI values in a performance Range (between 0 and 100%).

The operation of the KPI normalizer algorithm is discussed in detail in FIGS. 6 and 8 and in method for Key Performance Indicator (KPI) Normalizer for a Smart Service Analyzer 800.

The KPI normalizer algorithm provides as output normalized KPIs 954, such as Normalized Qualitative KPIs 630 and Normalized Quantitative KPIs 660 (FIG. 6). Qualitative KPIs are scaled directly in between 0 to 100% using the KPI Performance Thresholds 952, e.g., Success-rate or Failure rate. Quantitative KPIs that do not have any Performance Threshold include Release Cause Count, Data Traffic Throughput, or other quantitative KPIs within the scope of the embodiments. The KPI normalizer algorithm normalizes qualitative and quantitative KPI values in a performance Range (between 0 and 100%). Normalized KPIs 954 are provided as data input to Weighted Averaging operation 910 and as data input 534 to KPI Weighting operation 906. KPI Weighting operation 906 receives Service-Wise KIP Importance 956 as pre-defined user input. Process flows from operation 902 to operation 904.

At operation 904 of method for estimating CEI 900, a trigger is provided for operation 904, which determines whether KPI Weights are available. In response to KPI Weights being unavailable ("NO" branch of block 904), KPI Weighting operation 906 performs principal component analysis (PCA) for KPI weight distribution.

Principal component analysis (PCA) is a technique for analyzing large datasets containing a high number of dimensions/features per observation, increasing the interpretability of data while preserving the maximum amount of information, and enabling the visualization of multidimensional data. PCA is a statistical technique for reducing the dimensionality of a dataset. This is accomplished by linearly transforming the data into a new coordinate system where (most of) the variation in the data is described with fewer dimensions than the initial data.

In some embodiments, PCA is used for KPI weight distribution because the KPI weight is expected to have positive linear correlation with each of the features. In a non-limiting example, a KPI that is performing badly (e.g., high deviation), being used more than the other KPIs, having high importance (e.g., insight from stakeholders) is given higher priority compared to other KPIs. So that a historically bad performing KPI significantly reduces the CEI based on its importance and usage frequency.

In response to being triggered, KPI weighting algorithm provides a weighted output to KPI Weight Distribution algorithm 908. KPI Weighting operation 906 provides output estimates of KPI weight distribution for any service. KPI Weight Distribution algorithm 908 is provided as data input 572 to Weighted Averaging operation 910. KPI Weight Distribution operation 908 provides the trigger to operation 904 for again determining whether KPI Weights are available. In response to KPI Weights being available ("YES" branch of block 904), Weighted Average operation 910 provides an output 542 of weighted average of KPIs 958 (CEI per user per service (PUPS)).

The weighted average (arithmetic mean) is similar to an ordinary arithmetic mean (e.g., the most common type of average), except that instead of each of the data points contributing equally to the final average, some data points contribute more than others. In response to the weights being equal, then the weighted mean is the same as the arithmetic mean.

Figure 10:
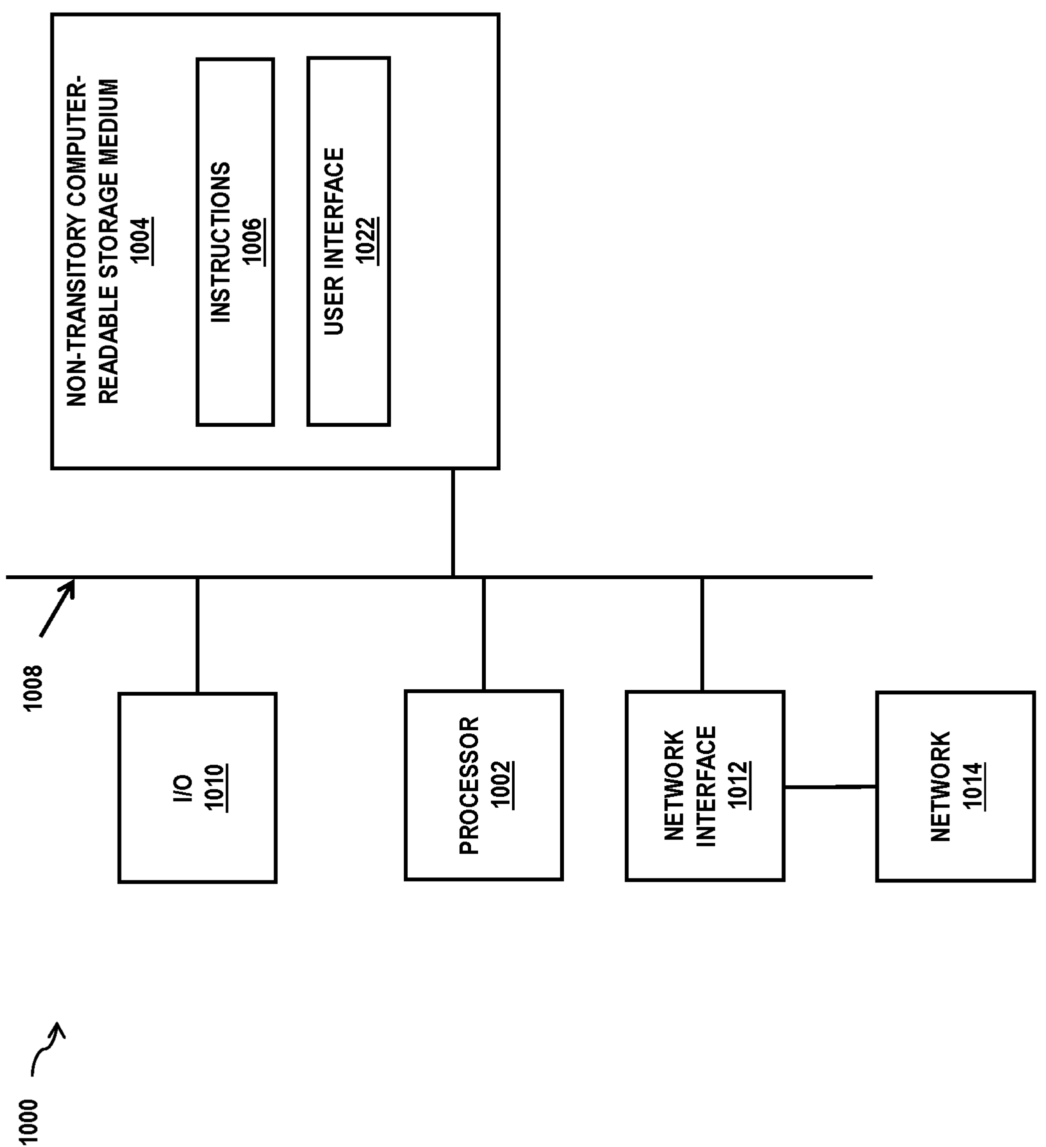
FIG. 10 is a high-level functional block diagram of a processor-based system according to some embodiments.

FIG. 10 is a high-level functional block diagram of a processor-based system 1000 according to some embodiments.

In some embodiments, processor-based system 1000 is a general-purpose computing device including a hardware processor 1002 and a non-transitory, computer-readable storage medium 1004. Storage medium 1004, amongst other things, is encoded with, i.e., stores, computer program code 1006, i.e., a set of executable instructions such as an algorithm, or methods 800 and 900. Execution of instructions 1006 by hardware processor 1002 represents (at least in part) a batch scheduling algorithm which implements a portion, or all the methods described herein in accordance with one or more embodiments (hereinafter, the noted processes and/or methods).

Processor 1002 is electrically coupled to the computer-readable storage medium 1004 via bus 1008. Processor 1002 is further electrically coupled to an I/O interface 1010 by bus 1008. A network interface 1012 is further electrically connected to processor 1002 via bus 1008. Network interface 1012 is connected to a network 1014, so that processor 1002 and computer-readable storage medium 1004 connect to external elements via network 1014. Processor 1002 is configured to execute computer program code 1006 encoded in computer-readable storage medium 1004 to cause processor-based system 1000 to be usable for performing a portion or all the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, computer-readable storage medium 1004 is an electronic, magnetic, optical, electromagnetic, infrared, and/or a semiconductor system (or apparatus or device). For example, computer-readable storage medium 1004 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 1004 includes a compact disk-read only memory (CD-ROM), a compact disk-read/write (CD-R/W), and/or a digital video disc (DVD).

In one or more embodiments, storage medium 1004 stores computer program code 1006 configured to cause processor-based system 1000 to be usable for performing a portion or all the noted processes and/or methods. In one or more embodiments, storage medium 1004 further stores information, such as an algorithm which facilitates performing a portion or all the noted processes and/or methods.

Processor-based system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

Processor-based system 1000 further includes network interface 1012 coupled to processor 1002. Network interface 1012 allows processor-based system 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, are implemented in two or more processors 1002.

Processor-based system 1000 is configured to receive information through I/O interface 1010. The information received through I/O interface 1010 includes one or more instructions, data, rules, and/or other parameters for processing by processor 1002. The information is transferred to processor 1002 via bus 1008. Processor-based system 1000 is configured to receive information related to user-interface (UI) 1022 through I/O interface 1010. The information is stored in computer-readable medium 1004 as user interface (UI) 1022.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

[1] An aspect of this description is directed to a method that includes normalizing one or more key performance indicator (KPI), where the one or more KPI include user-level quantitative KPI or user-level qualitative KPI; determining whether weights are available for each normalized KPI; and in response to the weights being available for each normalized KPI, converting, based on the weights for each normalized KPI, each normalized KPI to a customer experience index (CEI) for each user and for each network service. The method further includes determining whether a trend shift has occurred based on the CEI; and automatically generating an alert in response to a determination that the trend shift occurred.

[2] The method described in [1], further includes in response to the weights being unavailable for at least one normalized KPI, performing KPI weighting for each normalized KPI.

[3] The method described in [1] to [2], where the performing the KPI weighting for each normalized KPI includes performing principal component analysis (PCA) based on KPI data points; determining a weight for each normalized KPI based on the PCA; and outputting a KPI weight distribution for each normalized KPI.

[4] The method described in [1] to [3], further includes resetting a trigger indicating the weights are available for each normalized KPI.

[5] The method described in [1] to [4], further includes updating a weighted average algorithm with the KPI weight distribution for each normalized KPI.

[6] The method described in [1] to [5], further includes outputting the weighted average of the one or more KPI, wherein each weighted average is a customer experience index (CEI) per user, per network service.

[7] The method described in [1] to [6], where the normalizing the one or more KPI includes receiving the one or more KPI wherein the one or more KPI is based on call direct record (CDR) data, which comes from probing devices of a network; and receiving KPI performance thresholds for qualitative KPIs.

[8] An aspect of this description is directed to an apparatus configured to normalize one or more key performance indicator (KPI), where the one or more KPI include user-level quantitative KPI or user-level qualitative KPI; determine whether weights are available for each normalized KPI; and in response to the weights being available for each normalized KPI, convert, based on KPI weights, each normalized KPI to a customer experience index (CEI) for each user and for each network service. The apparatus is further configured to determine whether a trend shift has occurred based on the CEI; and automatically generate an alert in response to a determination that the trend shift occurred.

[9] The method described in [8], where the apparatus is further configured to in response to the weights being unavailable for at least one normalized KPI, perform KPI weighting for each normalized KPI.

[10] The method described in [8] to [9], where the performing the KPI weighting for each normalized KPI includes perform principal component analysis (PCA) based on KPI data points; determine a weight for each normalized KPI based on the PCA; and output a KPI weight distribution for each normalized KPI.

[11] The method described in [8] to [10], where the apparatus is further configured to reset a trigger indicating the weights are available for each normalized KPI.

[12] The method described in [8] to [11], where the apparatus is further configured to update a weighted average algorithm with the KPI weight distribution for each normalized KPI.

[13] The method described in [8] to [12], wherein the converting, based on the weights for each normalized KPI, each normalized KPI to the CEI for each user and for each network service includes perform, based on the weights for each normalized KPI, a weighted average of each normalized KPI, wherein each weighted average is the CEI for each user and for each network service.

[14] The method described in [8] to [13], where the normalizing the one or more KPI includes receive the one or more KPI wherein the one or more KPI is based on call direct record (CDR) data, which comes from probing devices of a network; and receive KPI performance thresholds for qualitative KPIs.

[15] An aspect of this description is directed to a non-transitory computer-readable media having computer-readable instructions stored thereon, which when executed by an apparatus cause the apparatus to normalize one or more key performance indicator (KPI), where the one or more KPI include user-level quantitative KPI or user-level qualitative KPI; determine whether weights are available for each normalized KPI; and in response to the weights being available for each normalized KPI, convert, based on KPI weights, each normalized KPI to a customer experience index (CEI) for each user and for each network service. The instructions are further configured to cause the apparatus to determine whether a trend shift has occurred based on the CEI; and automatically generate an alert in response to a determination that the trend shift occurred.

[16] The method described in [15], where execution of the computer-readable instructions further causes the apparatus to in response to the weights being unavailable for at least one normalized KPI, perform KPI weighting for each normalized KPI.

[17] The method described in to [16], where the performing the KPI weighting for each normalized KPI includes perform principal component analysis (PCA) based on KPI data points; determine a weight for each normalized KPI based on the PCA; and output a KPI weight distribution for each normalized KPI.

[18] The method described in to [17], where execution of the computer-readable instructions further causes the apparatus to reset a trigger indicating the weights are available for each normalized KPI.

[19] The method described in to [18], where execution of the computer-readable instructions further causes the apparatus to update a weighted average algorithm with the KPI weight distribution for each normalized KPI.

[20] The method described in to [19], where the converting, based on the weights for each normalized KPI, each normalized KPI to the CEI for each user and for each network service includes perform, based on the weights for each normalized KPI, a weighted average of each normalized KPI, wherein each weighted average is the CEI for each user and for each network service.

Separate instances of these programs can be executed on or distributed across any number of separate computer systems. Thus, although certain steps have been described as performed by certain devices, software programs, processes, or entities, this need not be the case. A variety of alternative implementations are understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

The foregoing disclosure provides illustration and description but is not intended to be exhaustive or to limit the implementations to the precise form disclosed. Modifications and variations are possible in light of the above disclosure or may be acquired from practice of the implementations.

What is claimed is:

1. A method, comprising:

providing probes for obtaining data about a mobile network;

providing the data about the mobile network obtained by the probes to a key performance indicator (KPI) generator;

based on the data about the mobile network obtained by the probes, generating one or more KPI at the KPI generator;

applying a machine learning (ML) model to normalize the one or more KPI in a performance range using KPI Performance Thresholds, where the one or more KPI include user-level quantitative KPI or user-level qualitative KPI;

determining whether weights are available for each of the one or more normalized KPI;

in response to the determining the weights are available for each of the one or more normalized KPI, converting, based on the weights for each of the one or more normalized KPI, each of the one or more normalized KPI to a customer experience index (CEI) for each user and for each network service;

calculating a shift ratio of a trend shift count representing the one or more normalized KPI that are equal to zero divided by a total number of iterations;

determining whether a trend shift representing the shift ratio having a value greater than a predetermined threshold has occurred based on the CEI;

automatically generating an alert in response to a determination that the trend shift occurred;

electronically sending the alert indicating that the trend shift has occurred to stakeholders for review;

receiving confirmation of the trend shift from the stakeholders; and in response to receiving the confirmation, creating new KPI performance thresholds based on the trend shift.

2. The method of claim 1, further comprising:

in response to the weights being unavailable for each of the one or more normalized KPI, providing an estimate of KPI weight distribution for each network service for subsequent determining of availability of the weights for each of the one or more normalized KPI.

3. The method of claim 2, wherein the performing the KPI weighting for each of the one or more normalized KPI comprises:

performing principal component analysis (PCA) based on KPI data points;

determining a weight for each of the one or more normalized KPI based on the PCA; and outputting a KPI weight distribution for each of the one or more normalized KPI.

4. The method of claim 3, further comprising:

resetting a trigger indicating the weights are available for each of the one or more normalized KPI.

5. The method of claim 3, further comprising:

updating a weighted average algorithm with the KPI weight distribution for each of the one or more normalized KPI.

6. The method of claim 1, wherein the converting, based on the weights for each of the one or more normalized KPI, each of the one or more normalized KPI to the CEI for each user and for each network service comprises:

performing, based on the weights for each of the one or more normalized KPI, a weighted average of each of the one or more normalized KPI, wherein each weighted average is the CEI for each user and for each network service.

7. The method of claim 1, wherein the normalizing the one or more KPI comprises:

receiving the one or more KPI wherein the one or more KPI is based on call direct record (CDR) data, which comes from probing devices of a network; and receiving KPI performance thresholds for qualitative KPIs.

8. An apparatus configured to:

provide probes for obtaining data about a mobile network;

provide the data about the mobile network obtained by the probes to a key performance indicator (KPI) generator;

based on the data about the mobile network obtained by the probes, generate one or more KPI at the KPI generator;

apply a machine learning (ML) model to normalize the one or more KPI in a performance range using KPI Performance Thresholds, where the one or more KPI include user-level quantitative KPI or user-level qualitative KPI;

determine whether weights are available for each of the one or more normalized KPI;

in response to the determining the weights are available for each of the one or more normalized KPI, convert, based on KPI weights, each of the one or more normalized KPI to a customer experience index (CEI) for each user and for each network service;

calculate a shift ratio of a trend shift count representing the one or more normalized KPI that are equal to zero divided by a total number of iterations;

determine whether a trend shift representing the shift ratio having a value greater than a predetermined threshold has occurred based on the CEI;

automatically generate an alert in response to a determination that the trend shift occurred;

electronically send the alert indicating that the trend shift has occurred to stakeholders for review;

receive confirmation of the trend shift from the stakeholders; and in response to receiving the confirmation, create new KPI performance thresholds based on the trend shift.

9. The apparatus of claim 8, further configured to:

in response to the weights being unavailable for each normalized KPI, provide an estimate of KPI weight distribution for each network service for subsequent determining of availability of the weights for each of the one or more normalized KPI.

10. The apparatus of claim 9, wherein the performing the KPI weighting for each of the one or more normalized KPI comprises:

perform principal component analysis (PCA) based on KPI data points;

determine a weight for each of the one or more normalized KPI based on the PCA; and output a KPI weight distribution for each of the one or more normalized KPI.

11. The apparatus of claim 10, further configured to:

reset a trigger indicating the weights are available for each of the one or more normalized KPI.

12. The apparatus of claim 10, further configured to:

update a weighted average algorithm with the KPI weight distribution for each of the one or more normalized KPI.

13. The apparatus of claim 8, wherein the converting, based on the weights for each of the one or more normalized KPI, each of the one or more normalized KPI to the CEI for each user and for each network service comprises:

perform, based on the weights for each of the one or more normalized KPI, a weighted average of each of the one or more normalized KPI, wherein each weighted average is the CEI for each user and for each network service.

14. The apparatus of claim 8, wherein the normalizing the one or more KPI comprises:

receive the one or more KPI wherein the one or more KPI is based on call direct record (CDR) data, which comes from probing devices of a network; and receive KPI performance thresholds for qualitative KPIs.

15. A non-transitory computer-readable media having computer-readable instructions stored thereon, which when executed perform operations to:

provide probes for obtaining data about a mobile network;

provide the data about the mobile network obtained by the probes to a key performance indicator (KPI) generator;

based on the data about the mobile network obtained by the probes, generate one or more KPI at the KPI generator;

apply a machine learning (ML) model to normalize the one or more KPI in a performance range using KPI Performance Thresholds, where the one or more KPI include user-level quantitative KPI or user-level qualitative KPI;

determine whether weights are available for each of the one or more normalized KPI;

in response to the determining the weights are available for each of the one or more normalized KPI, convert, based on KPI weights, each of the one or more normalized KPI to a customer experience index (CEI) for each user and for each network service;

calculate a shift ratio of a trend shift count representing the one or more normalized KPI that are equal to zero divided by a total number of iterations;

determine whether a trend shift representing the shift ratio having a value greater than a predetermined threshold has occurred based on the CEI;

automatically generate an alert in response to a determination that the trend shift occurred;

electronically send the alert indicating that the trend shift has occurred to stakeholders for review;

receive confirmation of the trend shift from the stakeholders; and in response to receiving the confirmation, create new KPI performance thresholds based on the trend shift.

16. The non-transitory computer-readable media of claim 15, wherein the computer-readable instructions are further configured to perform operations to:

in response to the weights being unavailable for each normalized KPI, provide an estimate of KPI weight distribution for each network service for subsequent determining of availability of the weights for each of the one or more normalized KPI.

17. The non-transitory computer-readable media of claim 16, wherein the performing the KPI weighting for each of the one or more normalized KPI comprises:

perform principal component analysis (PCA) based on KPI data points;

determine a weight for each of the one or more normalized KPI based on the PCA; and output a KPI weight distribution for each of the one or more normalized KPI.

18. The non-transitory computer-readable media of claim 17, wherein the computer-readable instructions are further configured to perform operations to:

reset a trigger indicating the weights are available for each of the one or more normalized KPI.

19. The non-transitory computer-readable media of claim 17, wherein the computer-readable instructions are further configured to perform operations to:

update a weighted average algorithm with the KPI weight distribution for each of the one or more normalized KPI.

20. The non-transitory computer-readable media of claim 15, wherein the converting, based on the weights for each of the one or more normalized KPI, each of the one or more normalized KPI to the CEI for each user and for each network service further includes:

performing, based on the weights for each of the one or more normalized KPI, a weighted average of each of the one or more normalized KPI, wherein each weighted average is the CEI for each user and for each network service.

* * * * *